US011202305B2

(12) United States Patent
Bang et al.

(10) Patent No.: US 11,202,305 B2
(45) Date of Patent: Dec. 14, 2021

(54) METHOD AND APPARATUS FOR TRANSMISSION AND RECEPTION OF DATA CHANNEL IN WIRELESS COMMUNICATION SYSTEM

(71) Applicant: Samsung Electronics Co., Ltd., Gyeonggi-do (KR)

(72) Inventors: Jonghyun Bang, Gyeonggi-do (KR); Jinyoung Oh, Gyeonggi-do (KR); Jeongho Yeo, Gyeonggi-do (KR); Hyunseok Ryu, Gyeonggi-do (KR); Sungjin Park, Gyeonggi-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 86 days.

(21) Appl. No.: 16/860,776

(22) Filed: Apr. 28, 2020

(65) Prior Publication Data

US 2020/0351917 A1   Nov. 5, 2020

(30) Foreign Application Priority Data

May 2, 2019  (KR) ......................... 10-2019-0051828
Nov. 6, 2019  (KR) ......................... 10-2019-0141071

(51) Int. Cl.
*H04W 4/00*       (2018.01)
*H04W 72/12*     (2009.01)
*H04W 16/14*     (2009.01)
*H04W 72/04*     (2009.01)
*H04W 74/08*     (2009.01)

(52) U.S. Cl.
CPC ....... *H04W 72/1268* (2013.01); *H04W 16/14* (2013.01); *H04W 72/042* (2013.01); *H04W 72/1289* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2017/0201968 A1* | 7/2017 | Nam | H04B 7/0632 |
| 2017/0289853 A1* | 10/2017 | Ahn | H04W 76/10 |
| 2018/0092080 A1* | 3/2018 | Kim | H04L 5/0092 |
| 2019/0089502 A1* | 3/2019 | Yi | H04L 5/0041 |
| 2019/0260530 A1* | 8/2019 | Yi | H04L 5/0041 |
| 2020/0021999 A1* | 1/2020 | Park | H04L 1/1854 |

(Continued)

FOREIGN PATENT DOCUMENTS

KR  10-2020-0034559  3/2020

*Primary Examiner* — Clemence S Han
(74) *Attorney, Agent, or Firm* — The Farrell Law Firm, P.C.

(57) ABSTRACT

A method and apparatus are provided for transmitting and receiving data and control information in a wireless communication system. A method performed by a terminal includes identifying a first idle subband and a second idle subband in an unlicensed band, wherein the first idle subband and the second idle subband are consecutive; and transmitting, to a base station, an uplink signal including uplink control information in at least one of the first idle subband and the idle second subband The uplink control information includes information indicating whether a guard band between the first idle subband and the second idle subband is used for uplink transmission. The uplink signal is decoded based on the uplink control information.

20 Claims, 16 Drawing Sheets

(56) References Cited

U.S. PATENT DOCUMENTS

| | | |
|---|---|---|
| 2020/0100276 A1 | 3/2020 | Oh et al. |
| 2020/0236710 A1* | 7/2020 | Sun .................. H04W 74/0808 |
| 2020/0267633 A1* | 8/2020 | Bendlin .................. H04W 4/20 |
| 2020/0267730 A1* | 8/2020 | Kim .................. H04W 72/0453 |
| 2020/0280971 A1* | 9/2020 | Moon .................. H04L 5/0094 |
| 2020/0305191 A1* | 9/2020 | Moon .............. H04W 74/0808 |
| 2020/0351668 A1* | 11/2020 | Kundu .................. H04L 5/0092 |
| 2021/0251005 A1* | 8/2021 | Pan .................. H04W 72/0446 |

* cited by examiner

METHOD AND APPARATUS FOR TRANSMISSION AND RECEPTION OF DATA CHANNEL IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2019-0051828 and 10-2019-0141071, which were filed in the Korean Intellectual Property Office on May 2, 2019 and on Nov. 6, 2019, respectively, the entire disclosure of each of which is incorporated herein by reference.

BACKGROUND

1. Field

The disclosure relates generally to a wireless communication system, and more particularly, to a method and apparatus for transmitting and receiving data and control information in a wireless communication system.

2. Description of Related Art

To meet the increasing demand for wireless data traffic, due to the commercialization of $4^{th}$ generation (4G) communication systems and increase of multimedia services, an improved $5^{th}$ generation (5G) communication system or pre-5G communication system has been developed. The 5G communication system or the pre-5G communication system may also be referred to as a beyond 4G network communication system or post-long term evolution (LTE) system.

To increase data rates, the implementation of the 5G communication system in an ultra-high frequency millimeter-wave (mmWave) band, e.g., a 60 GHz band, has been considered. To mitigate path loss of radio waves and increase transmission distances of radio waves in the ultra-high-frequency band, beamforming, massive multiple-input and multiple-output (MIMO), full dimensional MIMO (FD-MIMO), array antennas, analog beam-forming, and large scale antenna techniques are being discussed for use in 5G communication systems.

For improving network performance of a 5G communication system, technologies such as advanced small cells, a cloud radio access network (RAN), an ultra-dense network, device to device communication (D2D), wireless backhaul, a moving network, cooperative communication, coordinated multi-points (CoMP), reception interference cancellation, etc., have been developed. In 5G systems, hybrid frequency-shift keying (FSK) and quadrature amplitude modulation (QAM) modulation (FQAM) and slide window superposition coding (SWSC) are being developed as advanced coding modulation (ACM) methods, and non-orthogonal multiple access (NOMA) and sparse code multiple access (SCMA) are being developed as filter bank multi carrier (FBMC) methods.

The Internet has evolved to the Internet of things (IoT) network in which information is exchanged and processed among distributed components, i.e., things. Internet of everything (IoE) technology, in which big data processing technology through a connection to a cloud server and the like is combined with IoT technology, is also emerging. In order to implement the IoT, technical components such as sensing technology, wired/wireless communication and network infrastructure, service interface technology, and security technology are required. A sensor network, machine to machine (M2M), machine type communication (MTC), etc., for connection between things are being studied.

In an IoT environment, intelligent Internet technology (IT) services that collect and analyze data generated from connected objects may be provided. The IoT may be applied to smart homes, smart buildings, smart cities, smart cars, connected cars, smart grids, health care, smart home appliances, advanced medical services, etc., through fusion and convergence of existing IT and various industries.

Accordingly, various attempts have been made to apply 5G communication systems to the IoT network. For example, technologies such as a sensor network, M2M, MTC, etc., are being implemented by the 5G communication technologies such as beamforming, MIMO, array antennas, etc. The use of the cloud RAN as the above-mentioned big data processing technology may be an example of convergence of 5G technology and IoT technology.

SUMMARY

An aspect of the disclosure is to provide a method and apparatus for data channel transmission and reception and control information configuration in a wireless communication system.

Another aspect of the disclosure is to provide a method of configuring an uplink data channel region and configuring uplink control information in a system and node for receiving downlink signals or a system and node for transmitting uplink signals through unlicensed band.

In accordance with an aspect of the disclosure, a method performed by a terminal in a wireless communication system is provided. The method includes identifying a first idle subband and a second idle subband in an unlicensed band, wherein the first idle subband and the second idle subband are consecutive; and transmitting, to a base station, an uplink signal including uplink control information in at least one of the first idle subband and the second idle subband. The uplink control information includes information indicating whether a guard band between the first idle subband and the second idle subband is used for an uplink transmission. The uplink signal is decoded based on the uplink control information.

In accordance with another aspect of the disclosure, a method performed by a base station in a wireless communication system is provided. The method includes receiving, from a terminal, an uplink signal including uplink control information in at least one of a first subband and a second subband in an unlicensed band, wherein the first subband and the second subband are consecutive; and decoding the uplink signal based on the uplink control information. The first subband and the second subband are included in idle subbands identified by the terminal in the unlicensed band. The uplink control information includes information indicating whether a guard band between the first subband and the second subband is used for uplink transmission.

In accordance with another aspect of the disclosure, a terminal is provided for use in a wireless communication system. The terminal includes a transceiver; and a processor configured to identify a first idle subband and a second idle subband in an unlicensed band, wherein the first idle subband and the second idle subband are consecutive; and transmit, to a base station, via the transceiver, an uplink signal including uplink control information in at least one of the first idle subband and the second idle subband. The uplink control information includes information indicating whether a guard band between the first idle subband and the second idle subband is used for uplink transmission. The uplink signal is decoded based on the uplink control information.

In accordance with another aspect of the disclosure, a base station is provided for use in a wireless communication system. The base station includes a transceiver; and a processor configured to receive, from a terminal, via the transceiver, an uplink signal including uplink control information in at least one of a first subband or a second subband in an unlicensed band, wherein the first subband and the second subband are consecutive; and decode the uplink signal based on the uplink control information. The first subband and the second subband are included in idle subbands identified by the terminal in the unlicensed band. The uplink control information includes information indicating whether a guard band between the first subband and the second subband is used for uplink transmission.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
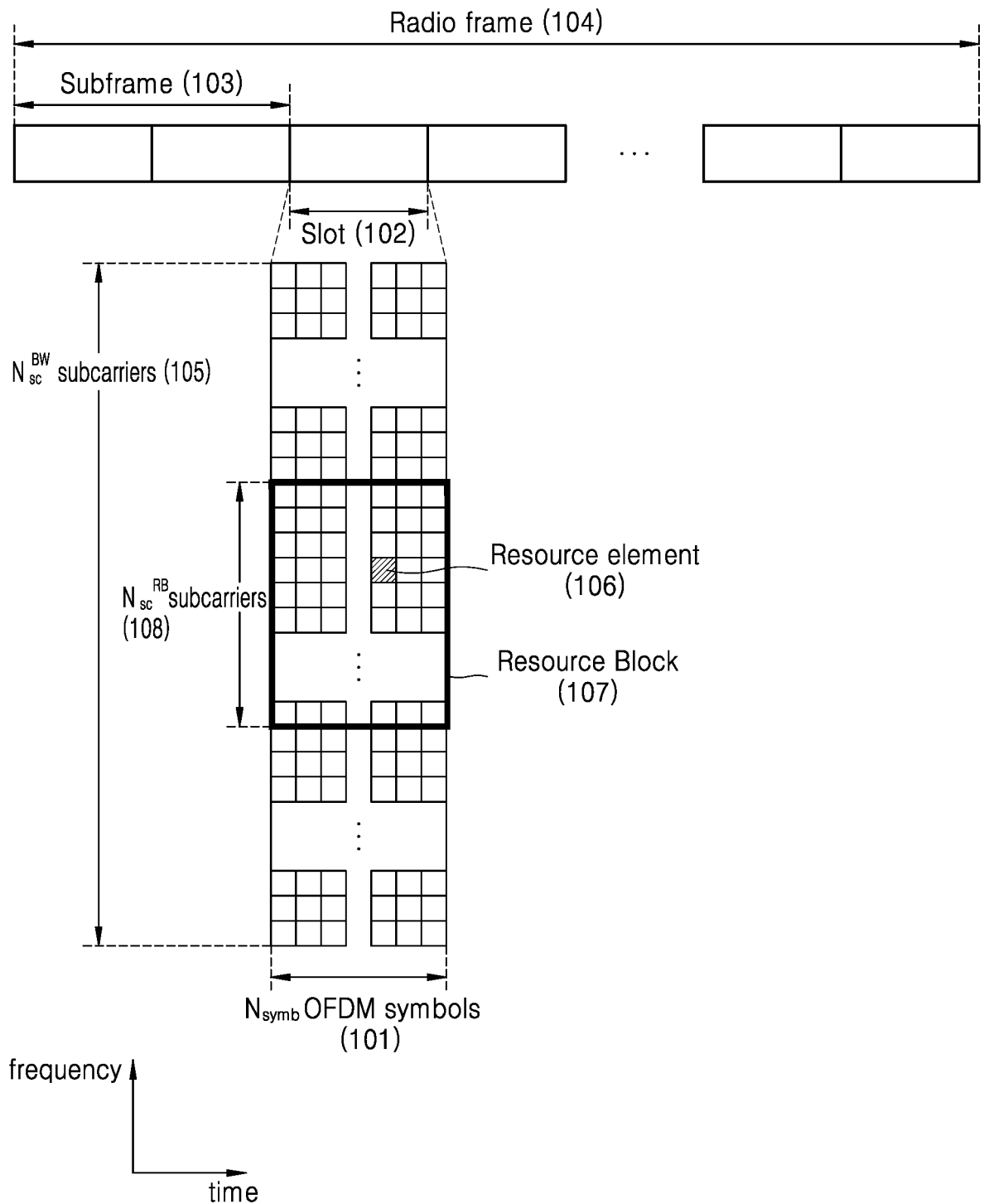
FIG. 1 illustrates an uplink and downlink time-frequency domain transmission structure of a new radio (NR) or 5G communication system, according to an embodiment.

Hereinafter, embodiments of the disclosure are described in detail with reference to the accompanying drawings.

Descriptions of the technical contents that are well-known in the art to which the disclosure pertains and are not directly related to the disclosure are omitted to avoid obscuring the subject matter of the disclosure.

Each element illustrated in the drawings may be exaggerated, omitted, or schematically illustrated. Further, the illustrated size of each element does not substantially reflect its actual size.

In the drawings, like reference numerals may denote like or corresponding elements.

The terms used herein are defined considering functions in the disclosure, and can be changed according to the customs or intents of users or operators. Accordingly, definitions of the terms should be understood on the basis of the entire description of the disclosure. For example, the terms used in the disclosure have been selected from commonly used general terms in consideration of the functions in the disclosure. However, the terms may vary according to the intention of one of ordinary skill in the art, case precedents, and the advent of new technologies. Accordingly, the terms used in the disclosure are defined based on their meanings in relation to the contents discussed throughout the specification, not by their simple meanings.

The expression "at least one of a, b or c" indicates only a, only b, only c, both a and b, both a and c, both b and c, all of a, b, and c, or variations thereof.

Examples of a UE may include a mobile station (MS), a cellular phone, a smartphone, a computer, a multimedia system capable of performing a communication function, etc.

A controller may be referred to as a processor.

A layer (or a layer apparatus) may be referred to as an entity.

Blocks of flowcharts and combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s).

In some alternative implementations, functions mentioned in blocks may occur out of order. For example, two blocks illustrated successively may actually be executed substantially concurrently, or the blocks may sometimes be performed in a reverse order according to the corresponding function.

The term "unit" may refer to a software component or hardware component such as a field-programmable gate array (FPGA) or an application-specific integrated circuit (ASIC), and perform a specific function. However, the term "unit" is not limited to software or hardware. A "unit" may be in an addressable storage medium, or may be formed to operate one or more processors. Accordingly, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Further, the components and "units" may be embodied to reproduce one or more central processing units (CPUs) in a device or security multimedia card. A "unit" may include at least one processor.

Support of various services is considered for 5G systems compared to existing 4G systems. Representative examples of such services include enhanced mobile broadband (eMBB), ultra-reliable and low-latency communication (URLLC), massive machine-type communication (mMTC), and evolved multimedia broadcast/multicast service (eMBMS). A system providing the URLLC service may be called a URLLC system, and a system providing the eMBB service may be called an eMBB system. The terms "service" and "system" may be used interchangeably.

A communication system may provide a plurality of services to a user, and thus a method and apparatus capable of appropriately providing the plurality of services to the user within the same time interval may be required.

According to an embodiment of the disclosure, in a wireless communication system, by configuring, considering the subband, an uplink data channel region and control information in a system and node for receiving downlink signals or a system and node for transmitting uplink signals, efficiency in the uplink data channel reception and frequency usage may be improved.

In a wireless communication system, e.g., an LTE or LTE-advanced (LTE-A) system or a 5G NR system, DCI including resource assignment information for transmitting downlink (DL) signals from a BS to a UE may be transmitted through a physical DL control channel (PDCCH), and the UE may be directed to receive at least one DL signal from among DL control information (e.g., a channel-state information reference signal (CSI-RS)), a physical broadcast channel (PBCH), and a physical DL shared channel (PDSCH)), by using the DCI.

The BS may transmit DCI through a PDCCH in a subframe n to direct the UE to receive a PDSCH in the subframe n. The UE having received the DCI may receive the PDSCH in the subframe n based on the received DCI. In an LTE, LTE-A, or NR system, the BS may transmit DCI including uplink (UL) resource assignment information to the UE through a PDCCH. The BS may direct the UE to transmit at least one UL signal from among UL control information (e.g., a sounding reference signal (SRS), a UL control information (UCI), or a physical random access channel (PRACH)) or a physical UL shared channel (PUSCH) to the BS. The UE having received UL transmission configuration information (or UL DCI or a UL grant) in a subframe n from the BS through a PDCCH may transmit a PUSCH based on a pre-defined time (e.g., n+4), a time configured by higher layer signaling (e.g., n+k), or UL signal transmission time indicator information included in UL transmission configuration information (e.g., n+k).

When configured DL transmission is performed in an unlicensed band from the BS to the UE, or when configured UL transmission is performed in an unlicensed band from the UE to the BS, a transmission device (i.e., the BS or the UE) may perform a channel access procedure (or a listen before talk (LBT) procedure) in the unlicensed band configured to transmit signals therethrough, before or immediately before a configured signal transmission start timing. Upon determining that the unlicensed band is idle, based on the result of the channel access procedure, the transmission device may access the unlicensed band and transmit configured signals.

Upon determining that the unlicensed band is not idle or is occupied, based on the result of the channel access procedure performed by the transmission device, the transmission device may not access the unlicensed band and thus may not transmit configured signals.

In the channel access procedure in the unlicensed band, the transmission device may determine whether the unlicensed band is idle by comparing an intensity of signals received in the unlicensed band for a certain time or a time calculated based on pre-defined rules (e.g., a time calculated based on one random value selected by at least the BS or the UE), with a pre-defined threshold or a threshold calculated based on a function including at least one parameter from among a channel bandwidth (BW), a signal BW for transmitting signals to be transmitted, an intensity of transmit power, and a beamwidth of transmitted signals.

When an intensity of signals received by the transmission device for X μs (e.g., 25 μs) is less than a pre-defined threshold T (e.g., −72 dBm), the transmission device may determine that the unlicensed band is idle, and transmit configured signals. A maximum time available to transmit signals may be limited based on a maximum channel occupancy time (MCOT) defined for an unlicensed band per country or region, or a device type of the transmission device (e.g., a BS, a UE, a master device, or a slave device). For example, in Japan, a BS or a UE may perform a channel access procedure in a 5-GHz unlicensed band, and then occupy a channel and transmit signals for up to 4 ms without performing an additional channel access procedure. When the intensity of the signals received for 25 μs is greater than the pre-defined threshold T (e.g., −72 dBm), the BS may determine that the unlicensed band is not idle, and therefore, may not transmit signals.

To provide various services and support a high data rate, 5G communication systems adopt various technologies such as a codeblock group (CBG)-based retransmission technology and technologies for transmitting UL signals without UL scheduling information. Accordingly, when 5G communication is to be performed in an unlicensed band, an efficient channel access procedure considering various parameters is required.

Wireless communication systems providing voice-based services are developing into broadband wireless communication systems providing high-speed and high-quality packet data services according to communication standards such as high speed packet access (HSPA), LTE or evolved universal terrestrial radio access (E-UTRA), and LTE-A of 3rd generation partnership project (3GPP), high rate packet data (HRPD) and ultra mobile broadband (UMB) of 3rd generation partnership project 2 (3GPP2), and 802.16e of the Institute of Electrical and Electronics Engineers (IEEE). In addition, 5G or NR communication standards are being developed for 5th-generation wireless communication systems.

Wireless communication systems including 5th-generation communication systems may provide at least one service from among eMBB, mMTC, and URLLC to UEs. The above-described services may be provided to the same UE during the same time interval. While eMBB is generally intended for high-speed transmission of high-capacity data, mMTC is generally intended for UE power minimization and access of multiple UEs, URLLC is generally intended for high reliability and low latency, these services are not limited thereto. The above-described services may serve as critical scenarios in LTE systems or post LTE systems (e.g., 5G/NR systems).

When the BS schedules eMBB data for a UE in a transmission time interval (TTI), and when URLLC data is to be transmitted in the scheduled TTI, a part of the eMBB data may not be transmitted and the URLLC data may be transmitted in the frequency band scheduled for the eMBB data and being used to transmit the eMBB data. Herein, the UE scheduled for the eMBB data and the UE scheduled for the URLLC data may be the same UE or different UEs. In this case, a part of the eMBB data that is already scheduled and being transmitted may not be transmitted and thus a probability of loss of the eMBB data may increase. Therefore, a method of processing received signals or a method of receiving signals should be determined for a UE scheduled for eMBB data or a UE scheduled for URLLC data.

As used herein, a BS is an entity for assigning resources to a UE, and examples of the BS include an eNode B, a Node B, a wireless access unit, a BS controller, or a network node. Examples of a UE include a terminal, an MS, a cellular phone, a smartphone, a computer, a multimedia system capable of performing a communication function, etc. A DL refers to a wireless transmission path of signals transmitted from a BS to a UE, and a UL refers to a wireless transmission path of signals transmitted from the UE to the BS.

Although embodiments of the disclosure will be described based on LTE or LTE-A systems, the disclosure is also applicable to other communication systems having similar technical backgrounds or channel types, e.g., a 5G or NR system. Further, the embodiments of the disclosure may also be applied to other communication systems through partial modification without greatly departing from the scope of the disclosure based on the judgment of one of ordinary skill in the art.

As an example of a broadband wireless communication system, an NR system utilizes orthogonal frequency-division multiplexing (OFDM) on a DL, and utilizes OFDM and single-carrier frequency-division multiple access (SC-FDMA) on a UL. The above-described dual connectivity schemes distinguish between data or control information of different users by assigning and using time-frequency resources for the data or control information of the users that do not to overlap each other, i.e., to achieve orthogonality therebetween.

The NR system utilizes a hybrid automatic repeat request (HARQ) scheme for retransmitting data from a physical layer when decoding failure occurs at initial transmission. In the HARQ scheme, when a receiver has not accurately decoded data, the receiver may transmit information indicating a decoding failure (i.e., negative acknowledgement (NACK)), to a transmitter and thus a physical layer of the transmitter may retransmit the data. The receiver may increase data reception performance by combining the data retransmitted from the transmitter, with the previous data that failed to be decoded. When the receiver has accurately decoded the data, the receiver may transmit information indicating decoding success (i.e., acknowledgement (ACK)), to the transmitter and thus the transmitter may transmit new data.

FIG. 1 illustrates a UL and DL time-frequency domain transmission structure of an NR or 5G communication system, according to an embodiment. More specifically, FIG. 1 illustrates a basic structure of a time-frequency domain that is a wireless resource region in which the above-described data or control channel is transmitted in a UL or DL of an NR system or a system similar thereto.

Referring to FIG. 1, the horizontal axis represents a time domain, and the vertical axis represents a frequency domain. The smallest transmission unit in the time domain is an OFDM or discrete Fourier transform-spread OFDM (DFT-s-OFDM) symbol, and $N_{symb}$ OFDM or DFT-s-OFDM symbols 101 may constitute one slot 102. Herein, the OFDM symbols represent symbols for signal transmission and reception using OFDM multiplexing, and the DFT-s-OFDM symbols represent symbols for signal transmission and reception using DFT-s-OFDM or single-carrier frequency-division multiple access (SC-FDMA) multiplexing, OFDM symbols will be representatively described below without distinguishing between OFDM and DFT-s-OFDM symbols for convenience of explanation, and embodiments of the disclosure described below based on DL signal transmission and reception may also be applied to UL signal transmission and reception.

When a subcarrier spacing is 15 kHz, one slot constitutes one subframe 103, and a slot length and a subframe length are equally 1 ms. In this case, the number and the length of slots constituting one subframe 103 may vary depending on the subcarrier spacing. For example, when the subcarrier spacing is 30 kHz, 4 slots may constitute one subframe 103. In this case, the slot length is 0.5 ms and the subframe length is 1 ms.

A radio frame 104 is a time domain duration including 10 subframes. The smallest transmission unit in the frequency domain is a subcarrier, and a total system transmission BW may include a total of $N_{SC}^{BW}$ subcarriers 105. The above-mentioned numerical values may vary. For example, in an LTE system, when the subcarrier spacing is 15 kHz, 2 slots constitute one subframe 103, while the slot length is 0.5 ms and the subframe length is 1 ms.

A basic unit of resources in the time-frequency domain is a resource element (RE) 106, which may be identified by an OFDM symbol index and a subcarrier index. A resource block (RB) (or a physical resource block (PRB)) 107 may be defined as consecutive $N_{symb}$ OFDM symbols 101 in the time domain and consecutive $N_{SC}^{RB}$ subcarriers 108 in the frequency domain. Accordingly, one RB 107 within one slot may include $N_{symb} \times N_{SC}^{RB}$ REs. Generally, the smallest frequency domain data assignment unit is the RB 107. In the NR system, generally, $N_{symb}=14$, $N_{SC}^{RB}=12$, and the number of RBs ($N_{RB}$) may vary depending on a system transmission BW. In the LTE system, generally, $N_{symb}=7$, $N_{SC}^{RB}=12$, and $N_{RB}$ may vary depending on a system transmission BW.

DCI may be transmitted within initial N OFDM symbols in a subframe. In general, N={1, 2, 3} and a BS may configure, for a UE, the number of symbols usable to transmit DCI, by higher layer signaling. The BS may vary the number of symbols usable to transmit DCI, per slot depending on the size of DCI to be transmitted in a current slot, and transmit information about the number of symbols to the UE through a PDCCH.

In the NR or LTE system, DL or UL data scheduling information may be transmitted as DCI from the BS to the UE. The DCI may be defined for various formats. For example, the DCI may indicate, depending on the respective formats, whether the DCI includes UL data scheduling information (i.e., a UL grant) or DL data scheduling information (i.e., a DL grant), whether the DCI is compact DCI having a small size, whether the DCI is fall-back DCI, whether spatial multiplexing using multiple antennas is applicable, or whether the DCI is power control DCI. For example, a DCI format indicating DL data scheduling information (i.e., a DL grant) (e.g., DCI format 1_0 of the NR system) may include at least one of various types of control information described below.

A DCI format identity: An identity for identifying a format of received DCI.

Frequency domain resource assignment: An indication of RBs assigned for data transmission.

Time domain resource assignment: An indication of a slot and symbols assigned for data transmission.

Virtual resource block (VRB)-to-PRB mapping: An indication of whether to apply a VRB mapping scheme.

Modulation and coding scheme (MCS): An indication of a modulation scheme used for data transmission, and the size of a transport block to be transmitted.

New data indicator: An indication of an initial transmission or retransmission of a hybrid automatic repeat request (HARQ).

Redundancy version: An indication of a redundancy version of the HARQ.

HARQ process number: An indication of a process number of the HARQ.

DL assignment index: An indication, for a UE, of the number of PDSCH reception results (e.g., the number of HARQ-acknowledgements (ACKs)) to be reported to a BS.

Transmit power control (TPC) command for PUCCH: An indication of a TPC command for a PUCCH.

PUCCH resource indicator: An indication of PUCCH resources used for HARQ-ACK reports including reception results on a PDSCH configured using the DCI.

PDSCH-to-HARQ_feedback timing indicator: An indication of information about a slot or symbols used to transmit PUCCH for HARQ-ACK reports including reception results on PDSCH configured using the DCI.

The DCI may be channel-coded and modulated and then transmitted on a PDCCH, which is a physical DL control channel, (or as control information) or an enhanced PDCCH (EPDCCH) (or as enhanced control information).

In general, DCI may be scrambled with a UE-specific radio network temporary identity (RNTI) or a UE identifier cell (C)-RNTI and a cyclic redundancy check (CRC) is added thereto, channel-coded, and then configured and transmitted as an independent PDCCH. In the time domain, the PDCCH may be mapped and transmitted for a control channel transmission duration. A frequency domain mapping location of the PDCCH may be determined based on an identity (ID) of each UE, and the PDCCH may be transmitted over a total system transmission BW.

DL data may be transmitted on the PDSCH that is a physical channel for DL data transmission. The PDSCH may be transmitted after the control channel transmission duration, and scheduling information thereof, e.g., a frequency domain mapping location and a modulation scheme, may be determined based on the DCI transmitted through the PDCCH.

By using the MCS included in the DCI, the BS may inform the UE of a modulation scheme applied to the PDSCH to be transmitted and the size of data to be transmitted (e.g., a transport block size (TBS)). For example, the MCS may include 5 bits. The TBS corresponds to the size of the data (e.g., a transport block (TB)) to be transmitted from the BS before the data is channel-coded for error correction.

Modulation schemes supported by the NR system may include quadrature phase shift keying (QPSK), 16 quadrature amplitude modulation (16 QAM), 64 QAM, and 256 QAM, and modulation orders Qm thereof are respectively 2, 4, 6, and 8. That is, the QPSK modulation may transmit 2 bits per symbol, the 16 QAM modulation may transmit 4 bits per symbol, the 64 QAM modulation may transmit 6 bits per symbol, and the 256 QAM modulation may transmit 8 bits per symbol. Modulation schemes higher than 256 QAM may also be used based on system modifications.

In the NR system, asynchronous HARQ in which a data retransmission timing is not fixed is adopted for UL/DL HARQ. For example, on a DL, when HARQ negative acknowledgements (NACKs) on data initially transmitted from the BS are fed back from the UE, the BS may determine a retransmission timing of the data based on a scheduling operation. For a HARQ operation, the UE may buffer data determined as an error as a result of decoding the received data, and then combine the buffered data with data retransmitted from the BS. HARQ ACK/NACK information on the PDSCH transmitted in a subframe n−k may be transmitted in a subframe n from the UE to the BS through a PUCCH or a PUSCH.

In a 5G communication system such as the NR system, the value k may be included and transmitted in the DCI for directing to receive or for scheduling the PDSCH transmitted in the subframe n−k, or be configured for the UE by using a higher layer signal. The BS may configure one or more values of k by using a higher layer signal, and signal a specific value k by using the DCI. In this case, k may be determined based on a HARQ-ACK processing capability of the UE, i.e., the shortest time taken from when the UE receives the PDSCH until the UE generates and reports HARQ-ACKs on the PDSCH. Before the value k is configured, the UE may use a pre-defined value or a default value.

In the NR system, one TB to be transmitted on a UL or DL may be added with a CRC at the tail or head thereof.

Although an NR system is used as an example above to describe a wireless communication system and a method and apparatus according to embodiments of the disclosure, the disclosure is not limited to the NR system and may be applied to other wireless communication systems such as LTE, LTE-A, LTE-A-Pro, and 5G systems.

Although the following description will be provided based on a system and device for transmitting and receiving signals using an unlicensed band, the disclosure may also be applied to a system operating in a licensed band.

In the following description, higher layer signaling or a higher layer signal may refer to transmitting signals from a BS to a UE by using a PDSCH of a physical layer, or from the UE to the BS by using a PUSCH of a physical layer, and may include radio resource control (RRC) signaling, packet data convergence protocol (PDCP) signaling, or signaling using a MAC control element (CE). The higher layer signaling or the higher layer signal may include system information commonly transmitted to a plurality of UEs, e.g., a system information block (SIB).

In a system for performing communication in an unlicensed band, a transmission device (e.g., a BS or a UE) that desires to transmit signals in an unlicensed band may perform a channel access procedure (or an LBT procedure) in the unlicensed band to be used for communication, before the signals are transmitted, and then access the unlicensed band and transmit the signals upon determining that the unlicensed band is idle, based on the channel access procedure. Upon determining that the unlicensed band is idle, based on the channel access procedure, the transmission device may access the unlicensed band and transmit the signals. However, upon determining that the unlicensed band is not idle, based on the channel access procedure, the transmission device may not transmit the signals.

In the channel access procedure in the unlicensed band, generally, the transmission device may determine whether the unlicensed band is idle, by measuring an intensity of signals received in the unlicensed band for a certain time or a time calculated based on pre-defined rules (e.g., a time calculated based on one random value selected by at least the BS or the UE), and comparing the measured intensity with a pre-defined threshold or a threshold calculated based on a received signal intensity determination function including one or more parameters such as a channel BW, a signal BW for transmitting signals to be transmitted, and an intensity of transmit power.

For example, the transmission device measures an intensity of signals for X μs (e.g., 25 μs) before the transmission of the signals. When the measured intensity is less than a pre-defined or calculated threshold T (e.g., −72 dBm), the transmission device may determine that the unlicensed band is idle, and transmit configured signals. After the channel access procedure, a maximum time available for consecutive signal transmission may be limited based on the MCOT defined for an unlicensed band per country or region, or a device type of the transmission device (e.g., a BS, a UE, a master device, or a slave device).

When the BS or the UE desires to transmit DL or UL signals in the unlicensed band, the channel access procedure to be performed by the BS or the UE may include the types described below.

Type 1: A channel access procedure is performed for a variable time and then UL/DL signals are transmitted.

Type 2: A channel access procedure is performed for a fixed time and then UL/DL signals are transmitted.

Type 3: UL/DL signals are transmitted without performing a channel access procedure.

Although a scenario in which a BS transmits DL signals to a UE in an unlicensed band and a scenario in which the UE transmits UL signals to the BS in an unlicensed band will be described together below, the disclosure may be equally applied or partially modified and applied to a scenario in which the UE transmits UL signals to the BS in an unlicensed band and a scenario in which the BS transmits DL signals to the UE in an unlicensed band. Accordingly, a detailed description of the DL signal transmission and reception will not be provided herein. Further, the following description assumes that one DL data (codewords or TBs) or UL data is transmitted and received between a BS and a UE. However, the disclosure may also be applied to a scenario in which a BS transmits DL signals to a plurality of UEs or a scenario in which a plurality of codewords or TBs are transmitted and received between a BS and a UE.

A transmission node (e.g., a BS or a UE) that desires to transmit signals in an unlicensed band may determine a type of a channel access procedure to use based on the type of the signals to be transmitted. When the BS desires to transmit DL signals including a PDSCH, in the unlicensed band, the BS may perform the Type 1 channel access procedure. When the BS desires to transmit DL signals not including a PDSCH, e.g., synchronization signals or a PDCCH, in the unlicensed band, the BS may perform the Type 2 channel access procedure and transmit the DL signals.

The type of the channel access procedure may also be determined based on a transmission length of the signals to be transmitted in the unlicensed band, or a length of a time or a duration for occupying and using the unlicensed band. In general, the Type 1 channel access procedure may be performed for a relatively long time compared to the Type 2 channel access procedure. Therefore, when the signals are to be transmitted for a short time duration or a time shorter than or equal to a reference time (e.g., X ms or Y symbols), the Type 2 channel access procedure may be performed. However, when the signals are to be transmitted for a long time duration or a time longer than the reference time (e.g., X ms or Y symbols), the Type 1 channel access procedure may be performed. Accordingly, different types of channel access procedures may be performed depending on a time for using the unlicensed band.

When the Type 1 channel access procedure is performed based on at least one of the above-described criteria, a channel access priority class may be determined based on a quality of service class identity (QCI) of the signals to be transmitted in the unlicensed band, and the channel access procedure may be performed using at least one of configuration values pre-defined as shown in Table 1 for the determined channel access priority class. For example, QCI values 1, 2, and 4 respectively refer to QCI values for services such as conversational voice, conversational video (live streaming), and non-conversational video (buffered streaming). When signals for a service not matching any QCI of Table 1 are to be transmitted in the unlicensed band, the BS may select a QCI of Table 1 that is the closest to a QCI of the service and then a channel access priority class therefor.

Table 1 shows mapping between channel access priority classes and QCI.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

Referring to Table 2 below, the BS may determine a defer duration, a set of contention window values or sizes CW_p, a minimum contention window value CW_min,p and a maximum contention window value CW_max,p, and a maximum channel occupancy time T_mcot,p based on a determined channel access priority p. That is, the BS that desires to transmit the DL signals in the unlicensed band may perform the channel access procedure in the unlicensed band at least for a time T_f+m_p*T_sl (the parameters are defined in 3GPP TS 37.213).

When the channel access procedure is to be performed based on a channel access priority class 3 (p=3), a length T_f+m_p*T_sl of a defer duration required to perform the channel access procedure may be configured using m_p=3.

Upon determining that the unlicensed band is continuously idle for a time m_p*T_sl, set counter N to N−1. In this case, N may be selected as an arbitrary integer value between 0 and the contention window value CW_p at a time at which the channel access procedure is performed.

Referring to Table 2, for the channel access priority class 3, the minimum contention window value and the maximum contention window value are respectively 15 and 63. Upon determining that the unlicensed band is idle in the defer duration and an additional channel access procedure performing duration, the BS may transmit the signals in the unlicensed band for the time T_mcot,p (e.g., 8 ms).

Table 2 shows channel access priority classes on a DL for convenience of explanation, but is not limited thereto. The channel access priority classes of Table 2 may be reused or UL channel access priority classes may be defined and used for UL.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value CW_p is the minimum contention window value CW_min,p. The BS having selected a value N as the initial contention window value may perform the channel access procedure for a time T_sl. The BS may change the value N to N−1 upon determining that the unlicensed band is idle, based on the channel access procedure performed for the time T_sl, and transmit the signals in the unlicensed band for the maximum channel occupancy time T_mcot,p, when N=0. Upon determining that the unlicensed band is not idle, based on the channel access procedure performed for the time T_sl, the BS may perform the channel access procedure again without changing the value N.

The contention window value CW_p may be changed based on reception results on a PDSCH in a reference subframe or slot of a DL signal transmission duration (or an MCOT) for which transmission is most recently performed by the BS in the unlicensed band at a time at which the BS starts the channel access procedure, a time at which the BS selects the value N to perform the channel access procedure, or immediately before the time. That is, the BS may receive reception results from the UE on DL data transmitted in the reference subframe or slot, and increase or minimize the contention window value CW_p based on a NACK ratio Z in the reported reception results.

Figure 2:
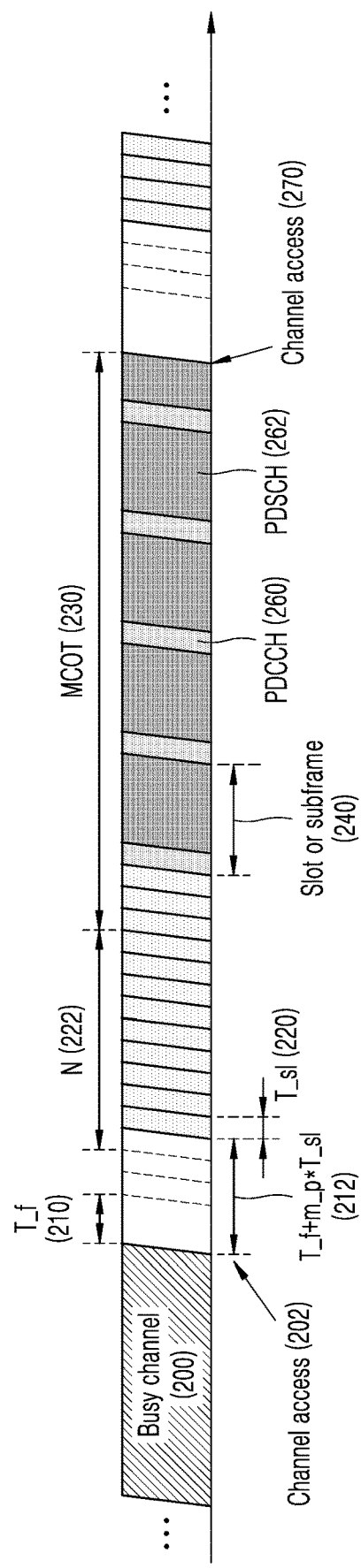
FIG. 2 illustrates a channel access procedure in an unlicensed band, according to an embodiment.

FIG. 2 illustrates a channel access procedure in an unlicensed band, according to an embodiment.

Referring to FIG. 2, a first transmission duration 240 (i.e., a slot or a subframe) of a DL signal transmission duration 230 for which transmission is most recently performed in an unlicensed band at a time 270 at which a BS starts a channel access procedure, a time at which the BS selects the value N to perform the channel access procedure, or immediately before the time, serves as a reference slot for determining whether to change a contention window for a channel access procedure.

When the BS does not receive reception results on a PDSCH transmitted in the first slot 240, a first subframe of a DL signal transmission duration for which transmission was most recently performed before the DL signal transmission duration 230 may serve as a reference subframe. For example, the BS does not receive reception results on a PDSCH transmitted in the first slot 240 when a time interval between the first subframe 240 and the timing 270 at which the BS starts the channel access procedure is less than or equal to n slots or subframes, i.e., when the BS starts the channel access procedure before a timing at which a UE may report reception results on PDSCH transmitted in the first subframe 240. That is, when reception results on DL data transmitted in the reference subframe 240 are not received from the UE at the time 270, at which the BS starts the channel access procedure, the time at which the BS selects the value N to perform the channel access procedure, or immediately before the time, the BS may determine a first subframe of a DL signal transmission duration for which transmission is most recently performed from among PDSCH reception results previously received from UEs, as a reference subframe. The BS may determine a contention window size used in the channel access procedure 270, by using reception results received from the UEs on DL data transmitted through the PDSCH in the reference subframe.

The BS may transmit the DL signals based on a channel access procedure (e.g., CW_p=15) configured using a channel access priority class 3 (p=3). Upon determining that at least 80% of the reception results of the UE for the DL data transmitted to the UE through the PDSCH in the first subframe from among the DL signals transmitted in the unlicensed band are NACKs, the BS may increase an initial contention window value (CW_p=15) to a next contention window value (CW_p=31).

Upon determining that fewer than 80% of the reception results of the UE are NACKs, the BS may maintain the contention window value or change the contention window value to the initial contention window value.

The changing of the contention window may be commonly applied to all channel access priority classes, or be applied to only the channel access priority class used in the channel access procedure.

In the reference subframe or slot for determining whether to change the contention window size, a method of determining reception results valid to determine whether to change the contention window size, from among the reception results transmitted or reported from the UE to the BS on the DL data transmitted through the PDSCH, i.e., a method of determining a value Z, is described below.

When the BS transmits one or more codewords or TBs to one or more UEs in the reference subframe or slot, the BS may determine the value Z as a NACK ratio of reception results transmitted or reported from the one or more UEs on the TBs received in the reference subframe or slot. For example, when 2 codewords or TBs are transmitted to one UE in the reference subframe or slot, the BS receives DL data reception results on the 2 TBs from the UE. When the NACK ratio Z of the reception results on the 2 TBs is greater than or equal to a threshold configured between the BS and the UE (e.g., Z=80%), the BS may change or increase the contention window size.

When the UE bundles DL data reception results on one or more subframes (e.g., M subframes) including the reference subframe or slot and transmits the bundled reception result to the BS, the BS may determine that the UE has transmitted M reception results. The BS may determine the value Z as a NACK ratio in the M reception results, and change, maintain, or initialize the contention window size.

When the reference subframe corresponds to a second slot of a subframe including two slots, the value Z may be determined as a NACK ratio in reception results transmitted from the UE to the BS on DL data received in the reference subframe (i.e., the second slot) and a next subframe.

When PDSCH scheduling information or DCI transmitted from the BS is transmitted in the same cell or frequency band as for transmitting the PDSCH, or when the PDSCH scheduling information or the DCI transmitted from the BS is transmitted in the unlicensed band, but in a different cell or frequency band than for transmitting the PDSCH, and when the BS determines that the UE does not transmit reception results on DL data received in the reference subframe or slot, and when the reception results transmitted from the UE on the DL data include reception results determined as discontinuous transmission (DTX), NACK/DTX, or any state, the BS may determine the reception results of the UE as NACKs to determine the value Z.

When the PDSCH scheduling information or the DCI transmitted from the BS is transmitted in the unlicensed band, and when the reception results transmitted from the UE on the DL data include reception results determined as DTX, NACK/DTX, or any state, the BS may not include the reception results of the UE in the value Z serving as a reference value for determining whether to change the contention window. That is, the BS may determine the value Z by ignoring the reception results of the UE.

When the BS transmits the PDSCH scheduling information or the DCI in a licensed band, and when the reception results transmitted from the UE to the BS on the reference subframe or slot include reception results determined as no transmission, i.e., indicating that no DL data is transmitted from the BS, the BS may determine the value Z by ignoring the reception results transmitted or reported from the UE on the DL data.

In a 5G system, considering various services and requirements, a frame structure should be flexibly defined and used. For example, different services may have different subcarrier spacings depending on requirements. Equation (1) may be used to support a plurality of subcarrier spacings in the 5G communication system.

$$\Delta f = f_0 2^m \quad (1)$$

In Equation (1), $f_0$ denotes a basic subcarrier spacing of a system, and m denotes an integer scaling factor. When $f_0$ is 15 kHz, a set of subcarrier spacings available for the 5G communication system may include 3.75 kHz, 7.5 kHz, 15 kHz, 30 kHz, 60 kHz, 120 kHz, 240 kHz, and 480 kHz. A usable subcarrier spacing set may vary depending on a frequency band. For example, 3.75 kHz, 7.5 kHz, 15 kHz, 30 kHz, and 60 kHz may be used in a frequency band less than or equal to 6 GHz, and 60 kHz, 120 kHz, and 240 kHz may be used in a frequency band greater than 6 GHz.

As a subcarrier spacing is in a reciprocal relationship to a length of an OFDM symbol, the length of the OFDM symbol may vary depending on the subcarrier spacing for configuring the OFDM symbol. For example, the symbol length is reduced to ½ when the subcarrier spacing is increased 2 times, and is increased 2 times when the subcarrier spacing is reduced to ½.

Figure 3:
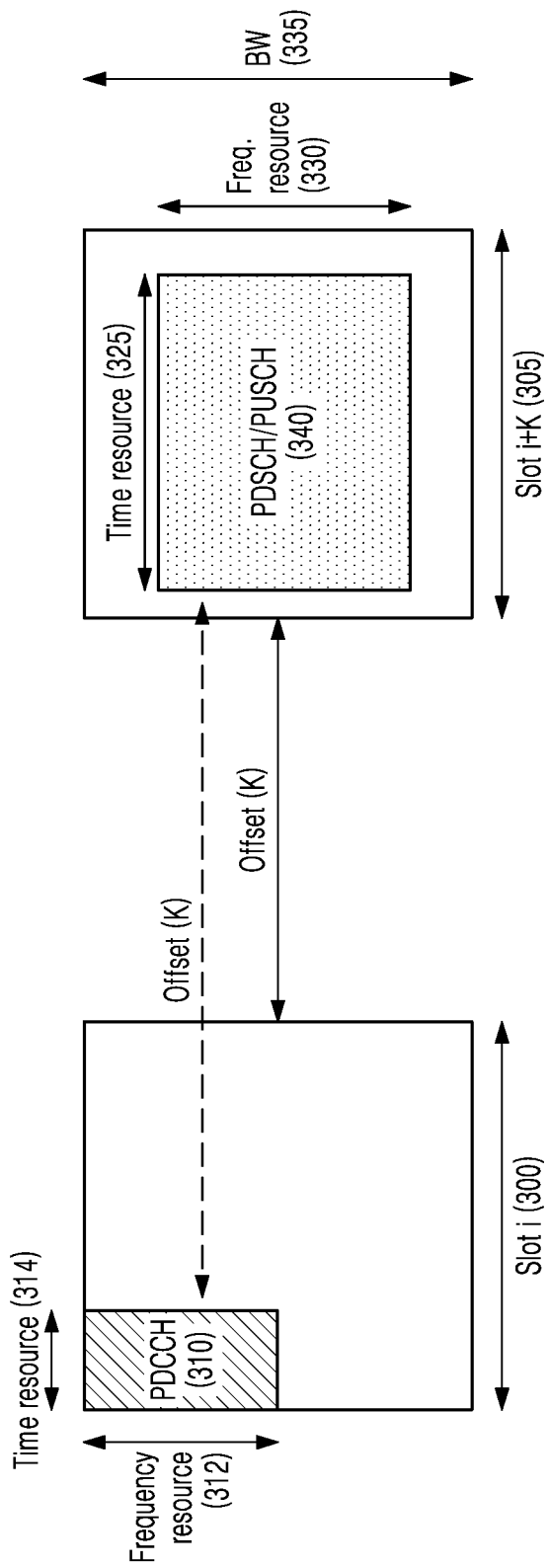
FIG. 3 illustrates a resource region for data channel transmission in an NR or 5G communication system, according to an embodiment.

FIG. 3 illustrates a resource region for data channel transmission in an NR or 5G communication system, according to an embodiment.

Referring to FIG. 3, a UE may monitor or detect a PDCCH 310 in a PDCCH region, which may also be referred to as a control resource set (CORESET) or a search space, configured by higher layer signaling from a BS. The PDCCH region includes time domain information 314 and frequency domain information 312. The time domain information 314 may be configured in units of a symbol whereas the frequency domain information 312 may be configured in units of an RB or a group of RBs. When the UE detects the PDCCH 310 in a slot i 300, the UE may obtain DCI transmitted through the detected PDCCH 310. The UE may obtain PDSCH or PUSCH scheduling information from the received DCI. The DCI may include information about a resource region in which the UE should receive a PDSCH transmitted from the BS (or a PDSCH transmission region), or information about a resource region assigned by the BS for the UE to transmit a PUSCH.

Although a UE receiving PUSCH scheduling information will now be described as an example, the disclosure is not limited thereto.

The UE having received the DCI may obtain a PUSCH reception slot index or offset information K from the DCI, and thus determine a PUSCH transmission slot index. In the example of FIG. 3, the UE may determine that it is scheduled to transmit a PUSCH in a slot i+K 305, based on the received offset information K with respect to the slot index i 300 in which the PDCCH 310 is received. The UE may determine the slot i+K 305 or a PUSCH start symbol or time in the slot i+K 305, based on the received offset information K with respect to the CORESET in which the PDCCH 310 is received. The UE may obtain information about a PUSCH transmission time-frequency resource region 340 in the PUSCH transmission slot 305, from the DCI. PUSCH transmission frequency resource region information 330 may be configured in units of a PRB or a group of PRBs.

The PUSCH transmission frequency resource region information 330 is information about a region included in an initial BW or an initial bandwidth part (BWP) determined by or configured for the UE in an initial access procedure. When a BW or a BWP is configured for the UE by higher layer signaling, the PUSCH transmission frequency resource region information 330 includes information about a region included in the BW or the BWP configured by higher layer signaling.

PUSCH transmission time resource region information 325 may be configured in units of a symbol or a group of symbols, or may include information indicating absolute time information. In this case, the PUSCH transmission time resource region information 325 may be represented as a combination of a PUSCH transmission start time or symbol and a PUSCH length or a PUSCH end time or symbol, and may be included in the DCI as one field or value. In this case, the PUSCH transmission time resource region information 325 may also be included in the DCI as separate fields or values for representing the PUSCH transmission start time or symbol and the PUSCH length or the PUSCH end time or symbol. The UE may transmit a PUSCH in the PUSCH transmission time-frequency resource region 340 determined based on the DCI.

Figure 4:
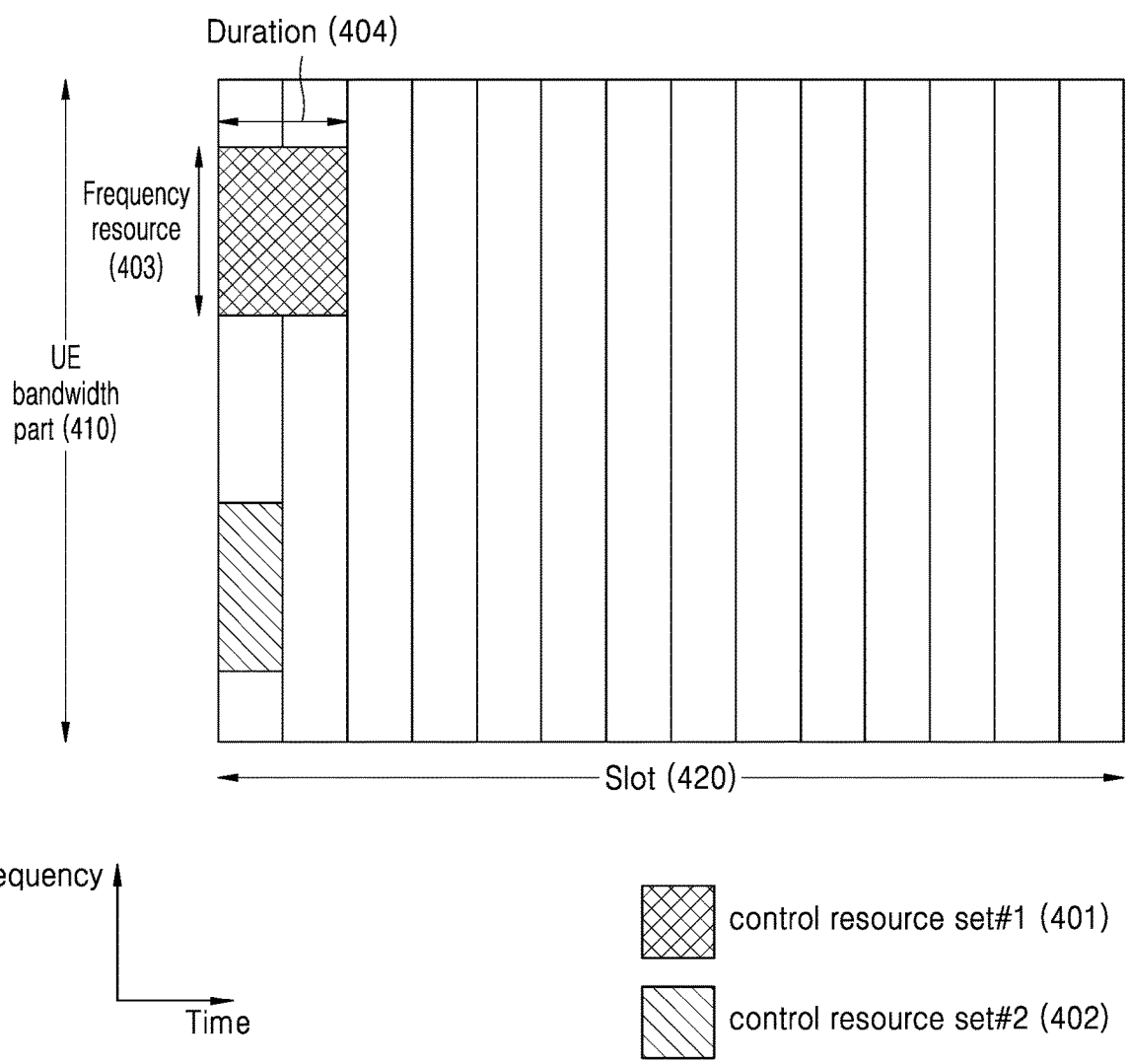
FIG. 4 illustrates a control region configuration of a downlink control channel in an NR or 5G communication system, according to an embodiment.

FIG. 4 illustrates a CORESET for DL control channel transmission in an NR or 5G communication system, according to an embodiment.

Referring to FIG. 4, a UE BWP 410 is configured in the frequency axis, and two CORESETs of a control resource set #1 401 and a control resource set #2 402 are configured in one slot 420 in the time axis.

The CORESETs 401 and 402 may be configured in specific frequency resources 403 in the entire UE BWP 410 in the frequency axis. In the time axis, the CORESETs 401 and 402 may be configured by one or a plurality of OFDM symbols, which may be defined to be a CORESET length (or control resource set duration) 404. In FIG. 4, for example, the control resource set #1 401 is configured to have a CORESET length of 2 symbols, and the control resource set #2 402 is configured to have a CORESET length of 1 symbol.

A CORESET in a 5G system may be configured by higher layer signaling, e.g., system information, master information block (MIB), or RRC signaling, which is provided from the BS to the UE. For a UE, configuring the CORESET may include providing information such as a CORESET identity, a CORESET frequency location, a CORESET symbol length, etc. The CORESET configuration may include the information shown in Table 3.

Figure 5:
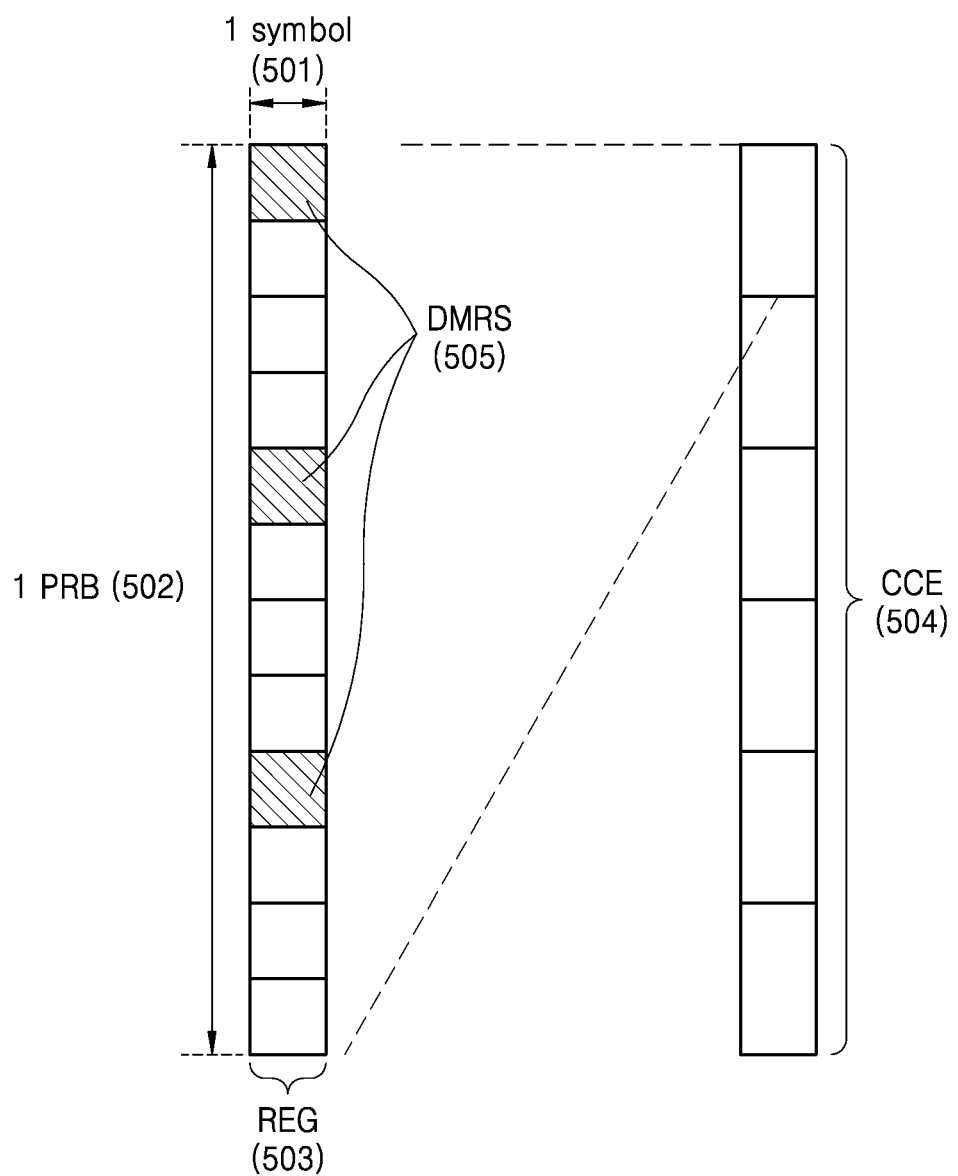
FIG. 5 illustrates a downlink control channel in an NR or 5G communication system, according to an embodiment.

In a 5G communication system, when a basic unit for assigning a DL control channel is a control channel element (CCE) 504, the CCE 504 may be configured with a plurality of REGs 503. In the example of FIG. 5, the REG 503 is configured with 12 REs, and when the CCE 504 is configured with 6 REGs, the CCE 504 may be configured with 72 REs. When a DL CORESET is configured, the corresponding region may be configured with a plurality of CCEs 504, and a specific DL control channel may be transmitted by being mapped to one or a plurality of the CCEs 504 according to an aggregation level (AL) in the CORESET. The CCEs 504 in the CORESET are classified by numbers (e.g., indexes), and the number may be assigned according to a logical mapping scheme.

TABLE 3

```
ControlResourceSet ::=                              SEQUENCE {
    -- Corresponds to L1 parameter 'CORESET-ID'
    controlResourceSetId                            ControlResourceSetId,
    frequencyDomainResources                        BIT STRING (SIZE (45)),
    duration                                        INTEGER
        (1..maxCoReSetDuration),
    cce-REG-MappingType                             CHOICE {
        interleaved                                 SEQUENCE {
            reg-BundleSize
            ENUMERATED {n2, n3, n6},
            precoderGranularity
            ENUMERATED {sameAsREG-bundle, allContiguousRBs},
            interleaverSize
            ENUMERATED {n2, n3, n6}
            shiftIndex
            INTEGER(0..maxNrofPhysicalResourceBlocks-1)
                                                    OPTIONAL
        },
        nonInterleaved                              NULL
    },
    tci-StatesPDCCH                                 SEQUENCE(SIZE
        (1..maxNrofTCI-StatesPDCCH)) OF TCI-StateId
        OPTIONAL,
    (QCL(Quasi Co-Location))
    tci-PresentInDCI                                ENUMERATED
        {enabled}
                      OPTIONAL,    -- Need S
}
```

In Table 3, tci-StatesPDCCH (or TCI state) configuration information may include information about one or a plurality of synchronization signal (SS)/PBCH block indexes or CSI-RS indexes which are in a quasi co location (QCL) relationship with a DMRS that is transmitted in the corresponding CORESET. FrequencyDomainResources configuration information may configure a frequency resource of the corresponding CORESET in a bitmap. Each bit may indicate a group of 6 PRBs that do not overlap each other. The first group signifies a 6 PRB group having the first PRB index as $6 \cdot [N_{BWP}^{start}/6]$, in which $N_{BWP}^{start}$ denotes a BWP start point. The most significant bit of a bitmap may indicate the first group and may be configured in ascending order.

FIG. 5 illustrates a DL control channel to be used in an NR or 5G communication system, according to an embodiment. Specifically, FIG. 5 illustrates an example of a basic unit of the time and frequency resources constituting a DL control channel used in an NR or 5G communication system.

Referring to FIG. 5, the basic unit of the time and frequency resources constituting a control channel is referred to as resource element group (REG) 503, and the REG 503 is defined as 1 OFDM symbol 501 in the time axis and 1 PRB 502 in the frequency axis, i.e., 12 subcarriers. The REG 503 includes a plurality of REGs concatenating each other, thereby configuring a DL control channel assignment unit.

Regions for REs, to which the DCI is mapped, and a demodulation reference signal (DMRS) 505 that is a reference signal for decoding the REs, are all included in the REG 503, i.e., the basic unit of the DL control channel illustrated, in FIG. 5. In FIG. 5, 3 DMRS 505 are transmitted in the REG 503.

The number of CCEs for the transmission of a PDCCH may be 1, 2, 4, 8, or 16 according to the AL, and the different number of CCEs may be used to implement link adaptation of a DL control channel. For example, when AL=L, one DL control channel may be transmitted through L CCEs. A UE detects a signal when not knowing information about a DL control channel, and in this state, a search space indicating a set of CCEs may be used to help the blind decoding. The search space is a set of DL control channel candidates configured with CCEs to be decoded by the UE at a given AL. As various ALs are available for forming one bundle with 1, 2, 4, 8, or 16 CCEs, the UE may have a plurality of search spaces. A search space set may be defined as a set of search spaces at all of the configured ALs.

The search space may be classified into a common search space and a UE-specific search space. UEs of a specific group or all UEs may search for the common search space of a PDCCH to receive common control information such as dynamic scheduling for system information or paging messages. For example, PDSCH scheduling assignment information for transmission of an SIB including business information of a cell may be received by searching for the common search space of a PDCCH. The common search space may be defined as a set of previously agreed upon CCEs because UEs of a specific group or all UEs receive a PDCCH. The scheduling assignment information about a UE-specific PDSCH or PUSCH may be received by searching for a UE-specific search space of a PDCCH. The UE-specific search space may be defined to be UE-specific based on the identity of a UE and functions of various system parameters.

In the 5G communication system, a parameter for a search space of a PDCCH may be configured in the UE from the BS based on the higher layer signaling, e.g., an SIB, an MIB, or RRC signaling. For example, the BS may configure the UE with the number of PDCCH candidates at each AL L, a monitoring cycle of a search space, a monitoring occasion of a symbol unit in a slot regarding a search space, a search space type (e.g., a common search space or a UE-specific search space), a combination of a DCI format and an RNTI to monitor in the corresponding search space, or a CORE-SET index for monitoring a search space. For example, the above-described configuration information may include the information in Table 4 below.

TABLE 4

```
SearchSpace : :=                              SEQUENCE {
  -- Identity of the search space. SearchSpaceId = 0 identifies the
  SearchSpace configured via PBCH (MIB) or ServingCellConfigCommon.
  searchSpaceId                               SearchSpaceId,
  controlResourceSetId                        ControlResourceSetId,
  monitoringSlotPeriodicityAndOffset          CHOICE {
    sl1                                                NULL,
    sl2
    INTEGER (0..1),
    sl4
    INTEGER (0..3),
    sl5                                       INTEGER
(0..4),
    sl8
    INTEGER (0..7),
    sl10                                      INTEGER
(0..9),
    sl16                                      INTEGER
(0..15),
    sl20                                      INTEGER
(0..19)
  }
                                              OPTIONAL,
  monitoringSymbolsWithinSlot                 BIT STRING (SIZE
(14))
                  OPTIONAL,
  nrofCandidates                              SEQUENCE {
    aggregationLevel1                         ENUMERATED {n0, n1,
n2, n3, n4, n5, n6, n,8},
    aggregationLevel2                         ENUMERATED {n0, n1,
n2, n3, n4, n5, n6, n8},
    aggregationLevel4                         ENUMERATED {n0, n1,
n2, n3, n4, n5, n6, n8},
    aggregationLevel8                         ENUMERATED {n0, n1,
n2, n3, n4, n5, n6, n8},
    aggregationLevel16                        ENUMERATED
{n0, n1, n2, n3, n4, n5, n6, n8}
  },
  searchSpaceType                             CHOICE {
    -- Configures this search space as common search space (CSS) and DCI
  formats to monitor.
    common
    SEQUENCE {
}
    ue-Specific                               SEQUENCE {
        -- Indicates whether the UE monitors in this USS for DCI formats
0-0 and 1-0 or for formats 0-1 and 1-1.
        formats
        ENUMERATED {formats 0-0-And-1-0, formats0-1-And-1-1},
        ...
    }
```

The BS may configure the UE with one or a plurality of search space sets according to configuration information. For example, the BS may configure the UE with a search space set 1 and a search space set 2. In the search space set 1, a DCI format A that is scrambled by X-RNTI may be configured to monitor in the common search space, and in the search space set 2, a DCI format B that is scrambled by Y-RNTI may be configured to monitor in the UE-specific search space.

According to the above-described configuration information, one or a plurality of search space sets may exist in the common search space or the UE-specific search space. A search space set #1 and a search space set #2 may be configured as the common search space, and a search space set #3 and a search space set #4 may be configured as the UE-specific search space.

In the common search space, a combination of a DCI format and an RNTI below may be monitored.

DCI format 0_0/1_0 with CRC scrambled by a C-RNTI, a configured scheduling (CS)-RNTI, a semi-persistent (SP)-CSI-RNTI, a random access (RA)-RNTI, a temporary cell (TC)-RNTI, a paging (P)-RNTI, or a system information (SI)-RNTI DCI format 2_0 with CRC scrambled by a slot format indicator (SFI)-RNTI DCI format 2_1 with CRC scrambled by an interruption (INT)-RNTI DCI format 2_2 with CRC scrambled by a transmit power control for PUSCH RNTI (TPC-PUSCH-RNTI) or TPC-PUCCH-RNTI DCI format 2_3 with CRC scrambled by a transmit power control for an SRS RNTI (TPC-SRS-RNTI)

The combination of a DCI format and an RNTI below may be monitored in the UE-specific search space.

DCI format 0_0/1_0 with a CRC scrambled by a C-RNTI, a CS-RNTI or a TC-RNTI

DCI format 1_0/1_1 with a CRC scrambled by a C-RNTI, a CS-RNTI, or a TC-RNTI

The above-described RNTIs may follow the following definition and use.

C-RNTI: UE-specific PDSCH scheduling use
TC-RNTI: UE-specific PDSCH scheduling use
CS-RNTI: quasi-statically configured UE-specific PDSCH scheduling use
RA-RNTI: PDSCH scheduling use in a random access stage
P-RNTI: PDSCH scheduling use for transmission of paging
SI-RNTI: PDSCH scheduling use for transmission of system information
INT-RNTI: for informing whether puncturing is performed on PDSCH
TPC-PUSCH-RNTI: for transmitting power control command regarding a PUSCH
TPC-PUCCH-RNTI: for transmitting power control command regarding a PUCCH
TPC-SRS-RNTI: for transmitting power control command regarding an SRS In the 5G communication system, a plurality of search space sets may be configured with different parameters, e.g., DCI formats. Accordingly, a group of search space sets that the UE monitors may vary at each point. For example, when a search space set #1 is configured with an X-slot cycle, a search space set #2 is configured with a Y-slot cycle, and X and Y are different from each other, the UE may monitor both of the search space set #1 and the search space set #2 in a specific slot, and one of the search space set #1 and the search space set #2 in another specific slot.

When a plurality of search space sets are configured in the UE, the following conditions may be considered in a method of determining search space sets to be monitored by the UE.

Condition 1: Limitation of the Maximum Number of PDCCH Candidates

The number of PDCCH candidates to monitor per slot may not exceed $M^\mu$. The $M^\mu$ indicates the maximum number of PDCCH candidates per slot in a cell configured with a subcarrier interval $15 \cdot 2^\mu$ kHz, which may be defined as shown in Table 5 below.

TABLE 5

| $\mu$ | Maximum number of PDCCH candidates per slot and per serving cell ($M^\mu$) |
|---|---|
| 0 | 44 |
| 1 | 36 |
| 2 | 22 |
| 3 | 20 |

Condition 2: Limitation of the Maximum Number of CCEs

The number of CCEs constituting the entire search space per slot may not exceed $C^\mu$. The entire search space may signify the entire CCE group corresponding to a plurality of search space set union regions. The $C^\mu$ may be defined as the maximum number of CCEs per slot in a cell configured with the subcarrier interval $15 \cdot 2^\mu$ kHz, which may be defined as shown in Table 6.

TABLE 6

| $\mu$ | Maximum number of CCEs per slot and per serving cell ($C^\mu$) |
|---|---|
| 0 | 56 |
| 1 | 56 |
| 2 | 48 |
| 3 | 32 |

For technical convenience, at a specific point, a situation satisfying both of the above-described Conditions 1 and 2 is defined as "Condition A". Accordingly, a situation that does not satisfy Condition A may indicate that at least one of the above-described Conditions 1 and 2 is not satisfied.

When Condition A is not satisfied at a specific point according to the search space sets of the BS, the UE may select and monitor some of search space sets configured to satisfy Condition A at the corresponding point, and the BS may transmit the PDCCH to the selected search space sets.

The following method may be employed as a method of selecting some search space sets from among the entire configured search space set.

Method 1

When Condition A on a PDCCH is not satisfied at a specific point (or slot), the UE (or BS) may preferentially select a search space set in which a search space type is configured with a common search space, from among search space sets exiting at a corresponding point, compared to a search space set configured with a UE-specific search space.

When all search space sets that are configured as a common search space are selected, i.e., Condition A is satisfied even after all search spaces configured as a common search space, the UE or the BS may select the search space sets that are configured as a UE-specific search space. When there are a plurality of search space sets that are configured as a UE-specific search space, a search space set having a lower search space set index may have a higher priority. The UE or the BS may select UE-specific search space sets considering the priority within a range satisfying Condition A.

In a 5G communication system, the UE may transmit UL signals without UL scheduling information to provide various services and support a high data rate. More specifically, when the UE tries to transmit UL signals without UL scheduling information, information for UL transmission such as resource assignment and MCS may be configured by RRC signaling or by using DCI of a PDCCH, and an available UL transmission method may have at least the types described below based on UL transmission configuration.

Type 1: UL transmission configuration using RRC signaling

Type 2: UL transmission configuration using a PUSCH of a physical layer

Figure 6:
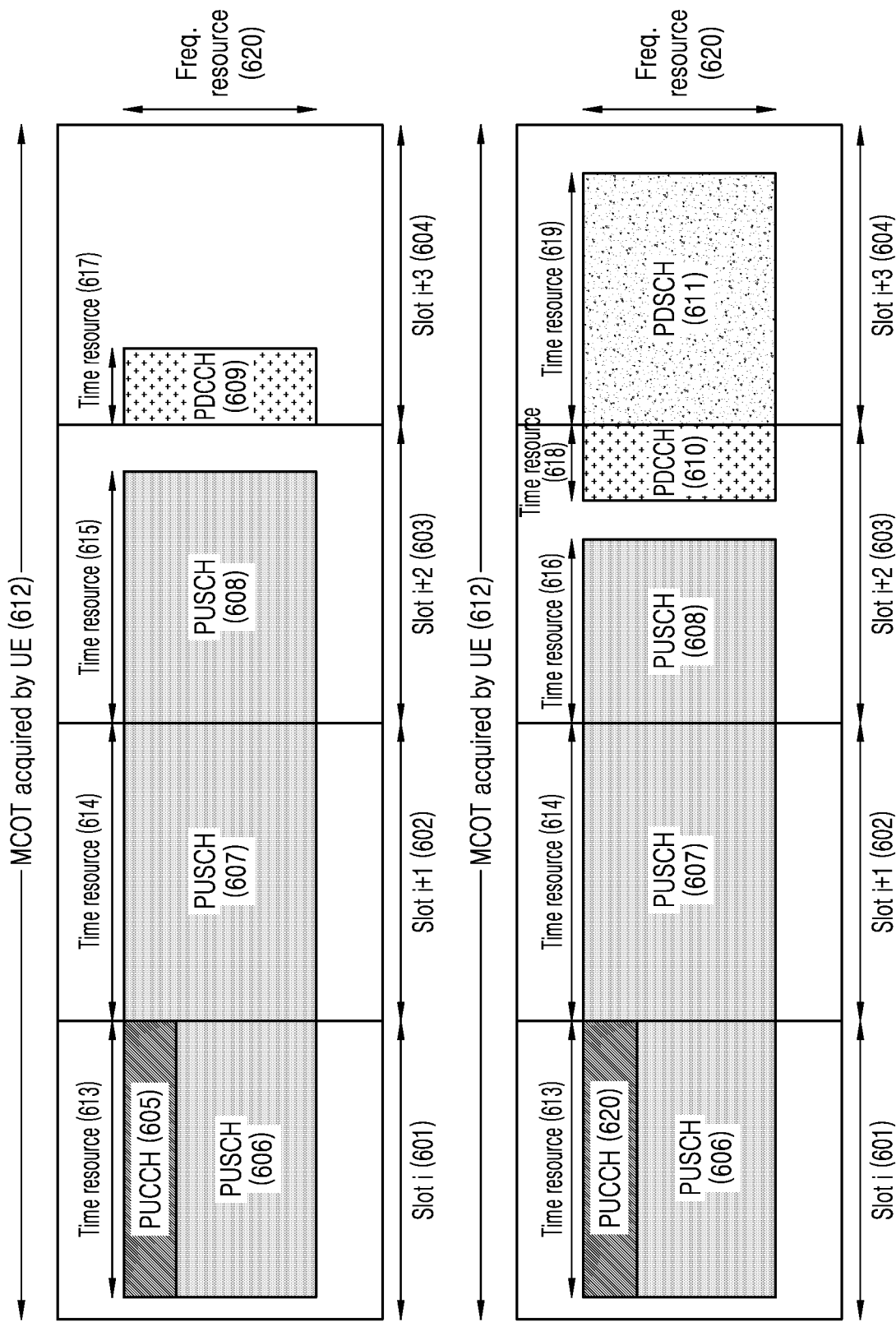
FIG. 6 illustrates transmitting uplink signals without uplink scheduling information in an unlicensed band, according to an embodiment.

FIG. 6 illustrates UL signal transmission without UL scheduling information in an unlicensed band, according to an embodiment.

Referring to FIG. 6, in an unlicensed band, a UE may perform a channel access procedure to transmit UL signals without UL scheduling information. In this case, when the UE accesses an unlicensed band by performing a channel access procedure for a variable time, the UE may schedule DL transmission in a last slot or subframe 604 of a maximum channel occupancy time by using a channel occupancy time sharing indicator of UL control information 605. A BS may determine channel access by performing a channel access procedure for a fixed time, and the UE may configure one last symbol of a slot or subframe 608 for UL transmission, as a gap guard for the channel access procedure of the BS.

DL transmission is limited to a PDCCH 609 as illustrated in an upper part of FIG. 6, and a start symbol of the PDCCH 609 is limited to a first symbol of the last slot or subframe 604 and PDCCH 609 has a symbol length within 2 symbols. As DL transmission time resource region information in the 5G communication system may be determined by the DCI, the transmission start time or symbol of a PDCCH 610 and the length and end time or symbol of a PDSCH 611 may be variously configured. Accordingly, when the UE shares the obtained maximum channel occupancy time, UL control information 620 should signal time resource region information for DL reception.

In the 5G communication system, in order to dynamically change the DL signal transmission and the DL signal transmission duration in a time division duplex (TDD) system, whether each of the OFDM symbols constituting one slot is a DL symbol, a UL symbol, or a flexible symbol, may be signaled by an SFI. A symbol signaled as a flexible symbol may be neither a DL symbol nor a UL symbol, or may signify a symbol that may be changed to a DL symbol or a UL symbol by the UE-specific control information or scheduling information. In this case, the flexible symbol may include a gap guard for switching from a DL to a UL.

The SFI is transmitted to a plurality of UEs at the same time through a UE group (or cell) common control channel. The SFI is transmitted through a PDCCH that is CRC-scrambled to an identity, e.g., SFI-RNTI, which is different from a UE-specific identity (e.g., a C-RNTI). In this case, the SFI may include information about N slots. A value N may be an integer or natural number greater than 0, or may be configured by using higher layer signals in the UE by the BS among sets of available preset values such as 1, 2, 5, 10, or 20. The size of the SFI information may be configured by using higher layer signals in the UE by the BS. An example of a slot format to be signaled by the SFI is shown in Table 7 below.

TABLE 7

Example of slot format configuration information

| FORMAT | \multicolumn{14}{c}{SYMBOL NUMBER (OR INDEX) WITHIN ONE SLOT} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |

TABLE 7-continued

Example of slot format configuration information

| FORMAT | SYMBOL NUMBER (OR INDEX) WITHIN ONE SLOT | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |
| 62-254 | Reserved | | | | | | | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

In Table 7, "D" denotes a DL, "U" denotes an UL, and "X" denotes a flexible symbol. In Table 7, 256 formats are supported. In the current NR system, the maximum size of an SFI information bit is 128 bits, and the SFI information bit is a value configured in the UE, by the BS, by using higher layer signals, e.g., dci-PayloadSize. The SFI information may include a slot format about a plurality of serving cells, and a serving cell slot format may be classified by a servingcell ID. A slot format combination of SFIs with respect to one or more slots regarding each serving cell may be included in the SFI information. For example, when the size of an SFI information bit is 3 bits and the SFI information is configured with an SFI with respect to one serving cell, 3-bit SFI information may be configured with a total of 8 SFIs or an SFI combination. The BS may indicate one SFI of the 8 SFIs to the UE through UE group common control information (e.g., group common DCI) (or SFI information). At least one of the 8 SFIs may be configured with SFIs with respect to a plurality of slots. For example, in Table 8 below, 5 pieces of information (slot format combination IDs 0, 1, 2, 3, and 4) in Table 7 are SFIs for one slot, and the other 3 pieces of information are information regarding SFIs (slot format combination ID 5, 6, and 7) for 4 slots, which are sequentially applied to four slots.

TABLE 8

Example of SFI information

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The UE is signaled to be flexible by higher layer signaling (e.g., tdd-UL-DL-ConfigurationCommon or tdd-UL-DL-ConfiguredDedicated) or fails to detect or receive a slot format DCI, e.g., DCI format 2_0, indicating symbols in a slot where a slot format is not configured by the higher layer signaling (e.g., tdd-UL-DL-ConfigurationCommon or tdd-UL-DL-ConfiguredDedicated), the UE may perform the following operations on the corresponding symbol.

When the UE receives DCI (e.g., DCI format 1_0, DCI format 1_1, DCI format 0_1) indicating reception of a PDSCH or a CSI-RS at a corresponding symbol, the UE may receive the PDSCH or the CSI-RS at the corresponding symbol.

When the UE receives DCI (e.g., DCI format 0_0, DCI format 0_1, DCI format 1_0, DCI format 1_1, DCI format 2_3) indicating transmission of a PUSCH, a PUCCH, a PRACH, or an SRS at the corresponding symbol, the UE may transmit/receive the PUSCH, the PUCCH, the PRACH, or the SRS at the corresponding symbol.

When the UE is configured with the reception of a PDSCH or a CSI-RS at the corresponding symbol as higher layer signaling, the UE does not receive the PDSCH or the CSI-RS at the corresponding symbol.

When the UE is configured with an SRS, a PUCCH, a PUSCH, or a PRACH transmission by higher layer signaling at the corresponding symbol, and the transmission start of a corresponding UL transmission signal is located after a PUSCH preparation time from the last symbol of a CORESET to monitor the DCI format, the UE does not transmit the corresponding UL signal.

When the UE is configured with an SRS, a PUCCH, a PUSCH, or a PRACH transmission as higher layer signaling at the corresponding symbol, and the transmission start of the corresponding UL transmission signal is located before the PUSCH preparation time from the last symbol of a CORESET to monitor the slot format DCI, the UE may transmit the corresponding UL signal.

In the 5G communication system, the BS or UE may transmit/receive signals in a wide unlicensed band. The wide unlicensed band may be configured by a subband unit (e.g., 20 MHz). The BS and UE may perform a channel access procedure for each subband to occupy an unlicensed band, and perform configured signal transmission by accessing an unlicensed band in at least one method of all subbands, one subband, or consecutive subbands, which respectively are in an idle state, according to a result of the performed channel access procedure. In this case, UL signals may be transmitted as separate transmission data for each idle subband or one transmission data in a plurality of idle subbands. When the UE performs a channel access procedure for each subband in a wide unlicensed band and transmits UL signals in an idle subband, the BS may be unable to identify which subband is occupied by the UE for the UL transmission. Accordingly, the BS may demodulate the transmitted UL signal considering available UL transmission combinations within a scheduled subband. Accordingly, in order to reduce BS signal processing complexity, the UE should inform the BS of resource region information used for the UL transmission or a result of the performed channel access procedure.

In accordance with an embodiment of the disclosure, a method and apparatus are provided for providing information about a resource region used for UL transmission and a result of the performed channel access procedure for UL transmission from the UE to the BS, which are configured to receive or transmit DL signals or UL signals in a wide unlicensed band. The method and apparatus for provide resource region information to be used by the UE as DL control information or transmit UL control information including UL transmission information.

A method and apparatus according to an embodiment of the disclosure may not be limited to each embodiment, but the disclosure may be used for a method and apparatus for configuring or determining a UL transmission region by using all of one or more embodiments according to the disclosure or a combination of some embodiments thereof. In an accordance with an embodiment of the disclosure, although the BS and the UE have been describes as configuring or determining a UL transmission region in a subband-based wide unlicensed band as an example, the disclosure may also be applicable to configuring a UL transmission region in a wide band system such as multi-carrier or carrier aggregation transmission. The disclosure may be applicable to configuring a control channel region in a single carrier or single band system other than a wide band.

In accordance with an embodiment of the disclosure, although the BS and the UE operating in a wide unlicensed band are assumed in the description, the method and apparatus proposed by the disclosure may be applied to the BS and the UE operating in a licensed band or shared spectrum, in addition to the unlicensed band.

In accordance with an embodiment of the disclosure, although the scheduling-based wide-band UL transmission is assumed in the description, the method and apparatus according to the disclosure may be applied to (configured grant) UL transmission that does not need scheduling.

In accordance with an embodiment of the disclosure, a method is provided for configuring UL signal transmission in a guard band in a wide unlicensed band during UL transmission by a UE. The method and apparatus indicate, by the UE, guard band use information during UL transmission through UL control information to the BS.

Figure 7:
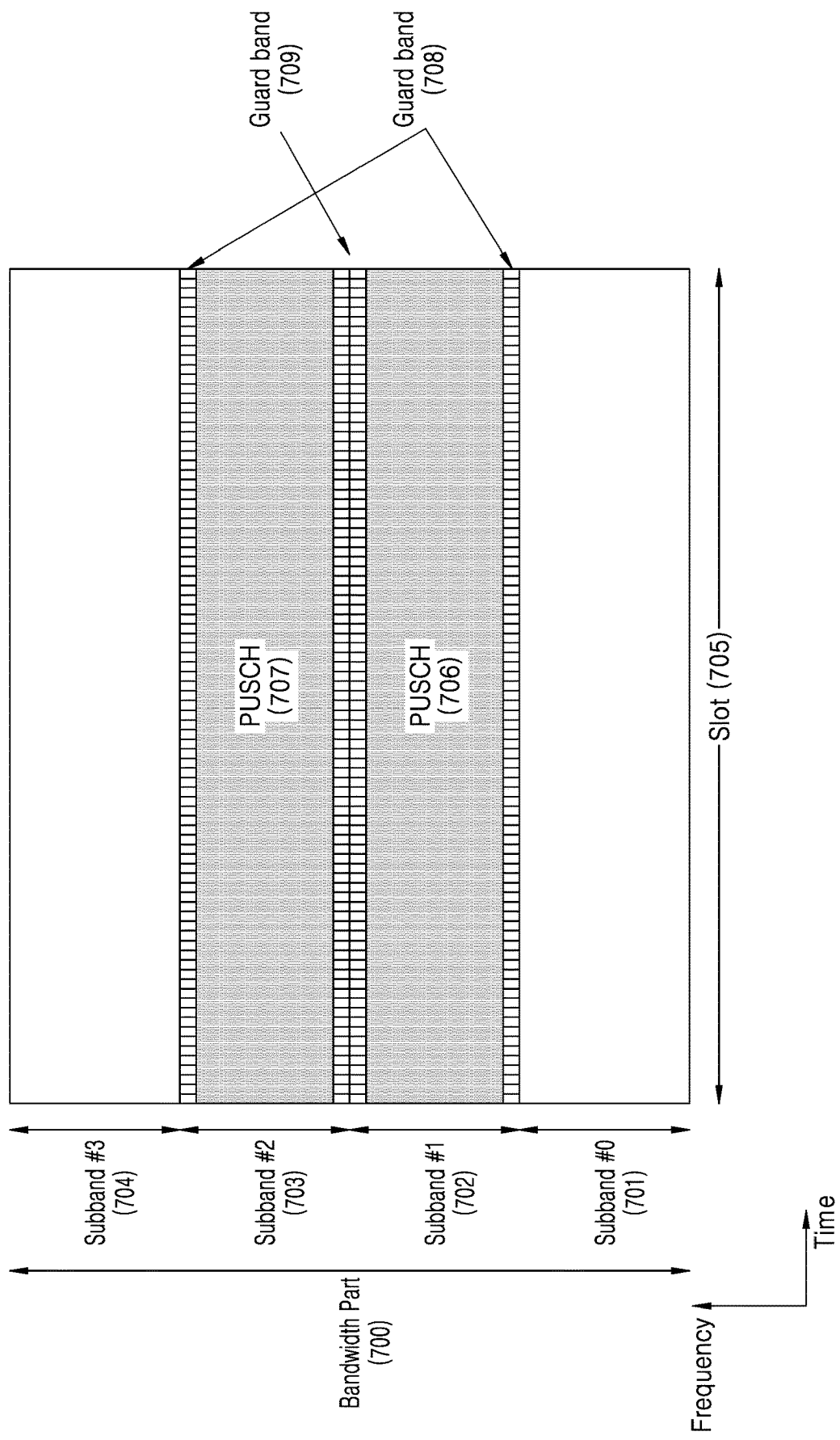
FIG. 7 illustrates an uplink signal transmission configuration in a guard band during uplink transmission by a user equipment (UE) in a wide unlicensed band, according to an embodiment.

FIG. 7 illustrates UL signal transmission configuration in a guard band during UL transmission by a UE in a wide unlicensed band, according to an embodiment.

Referring to FIG. 7, in the BS and the UE that transmit/receive signals in a wide unlicensed band, the operation of the UE is described assuming that a channel access procedure is performed based on a subband, and then the UE is configured to perform PUSCH transmission by accessing at least one subband in an idle state according to a result of the performed channel access procedure.

The UE may perform a channel access procedure by subband units 701, 702, 703, and 704. As a result of the performed channel access procedure, when a subband #1 702 and a subband #2 703 are determined to be idle subbands, the UE may transmit the UL signals 706 and 707 in the subband #1 702 and the subband #2 703, respectively. The UL signals 706 and 707 may be transmitted as separate transmission data for each idle subband or one transmission data in a plurality of idle subbands.

As a channel access procedure is performed for each subband in a wide unlicensed band, guard bands 708 and 709 in which signals are not transmitted exist in each subband at both ends of a subband to protect performing of a channel access procedure between neighboring subbands. The BS may perform UL scheduling considering the guard bands 708 and 709.

Alternatively, the BS may perform UL scheduling without considering the guard bands 708 and 709. In this case, during UL transmission, the UE may not transmit UL signals in the guard bands 708 and 709.

When the UE tries to perform UL transmission in the consecutive subbands 702 and 703 as a result of the performed channel access procedure, the performing of a channel access procedure in the neighboring subbands does not need to be protected in the guard band 709 between the consecutive subbands. That is, when the consecutive subbands 702 and 703 are occupied, the UE may transmit UL signals in the guard band 709 between consecutive subbands.

In the following description, a method is provided for configuring or determining, by the UE, signal transmission regarding a guard band between consecutive subbands in the BS.

Figure 8:
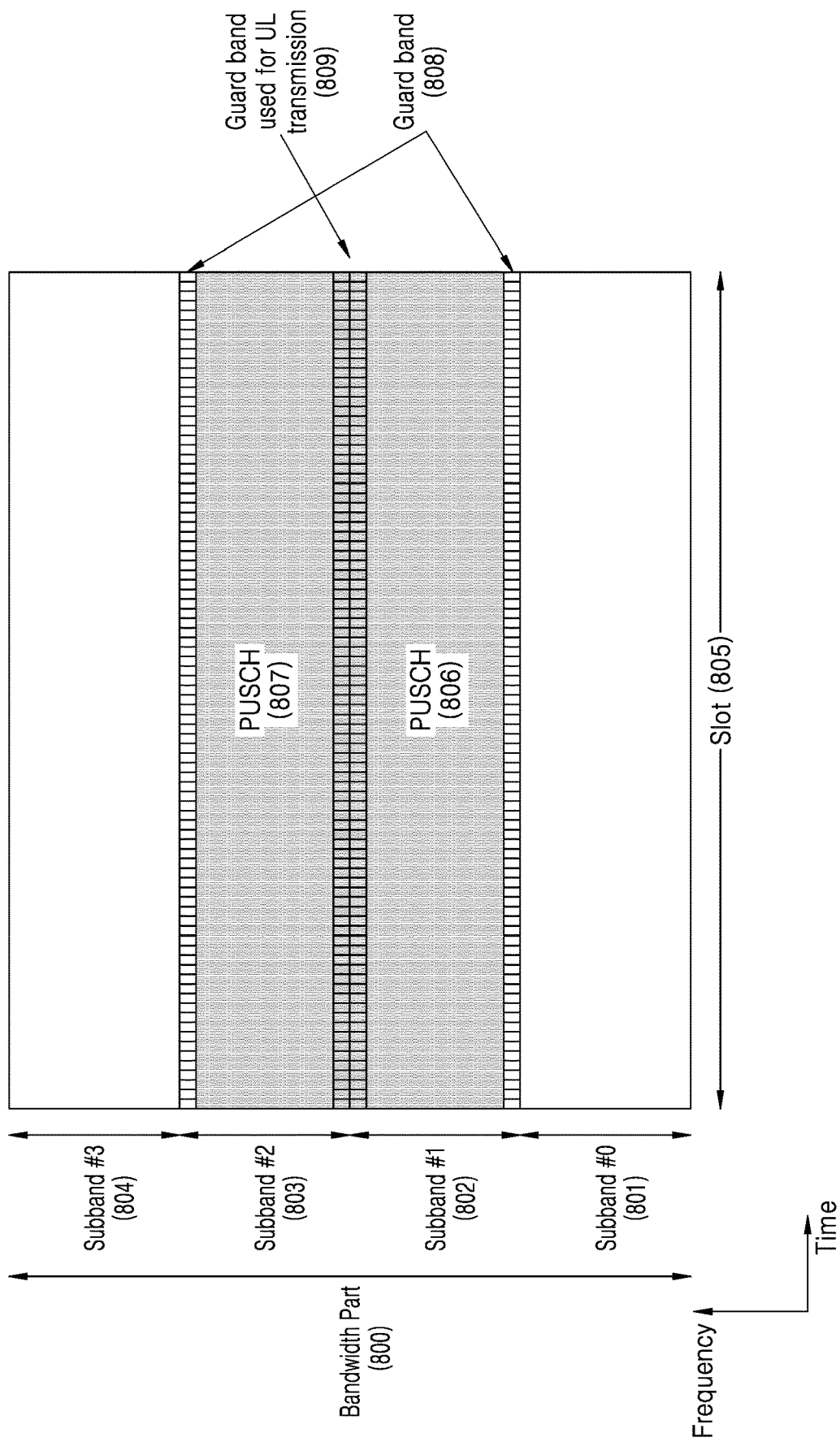
FIG. 8 illustrates an uplink signal transmission configuration in a guard band during uplink transmission by a UE in a wide unlicensed band, according to an embodiment.

FIG. 8 illustrates an uplink signal transmission configuration in a guard band during uplink transmission by a UE in a wide unlicensed band, according to an embodiment.

Referring to FIG. 8, a UE may transmit UL signals by including a guard band use indicator in UL control information. When the UE tries to transmit UL signals 806 and 807 in a plurality of consecutive subbands 802 and 803 as a result of the performed channel access procedure, UL signals may be transmitted in a guard band 809 located between the consecutive subbands 802 and 803. The UE may transmit UL signals to the BS by including a guard band use indicator in UL control information, and the BS having received the UL signals may perform decoding on the UL signals including the guard band 809 located between the consecutive subbands 802 and 803.

Different methods of configuring a guard band use indicator in UL control information are described below.

Method 1

The UE may indicate whether a guard band is used or not by using 1-bit signaling. For example, when a guard band use indicator included in UL control information and transmitted by the UE is 1, the BS may decode UL signals including the signals transmitted in the guard band. When the guard band use indicator included in UL control information and transmitted by the UE is 0, the BS may determine that no UL signal has been transmitted in the guard band, and decode the UL signals except for the guard band.

Method 2

The UE may indicate whether a guard band is used or not by using X-bit signaling. X may be configured by the number of subbands configured by higher layer signaling or the number of subbands scheduled through DL control information or higher layer signaling from the BS. For example, the UE may receive UL scheduling in four subbands from the BS, and perform UL transmission only in a subband #1 802 and a subband #2 803 as a result of performing a channel access procedure for each subband. When including UL signals in the guard band 809 between the consecutive subbands 802 and 803, the UE may indicate whether a guard band is used or not with bit information having a 4-bit size (e.g., 0110) in UL control information. The BS having received bit information indicating whether a guard band is used or not may decode the UL signals including the signals transmitted in the guard band 809 between the consecutive subbands 802 and 803.

During UL control information transmission including a guard band use indicator, the UE may transmit UL control information in each of the subbands 802 and 803 for performing UL transmission. Each UL control information may include information about each subband (e.g., separate transmission data for each subband) to transmit at least UL or information about the entire subband for performing UL transmission (e.g., one transmission data in a plurality of idle bands).

Alternatively, during UL transmission, the UE may transmit signals including UL control information only in at least one of specific subbands, and a method of selecting at least one specific subband may be described below.

Method 3

After performing a channel access procedure for each subband, the UE may perform UL transmission including UL control information only in a subband having the lowest (or the highest) subband index (or configuration index) among at least one idle subband for performing the UL transmission.

Alternatively, the UE may perform UL transmission including UL control information only in a subband where CORESET #0 to SS/PBCH block transmission is configured.

Alternatively, the UE may transmit UL signals including UL control information in a subband that the BS indicates by using the higher layer signal or control channel.

The UE may also determine a subband to transmit including UL control information by one or more combinations of the above-described methods. The BS may not perform decoding on the UL control information on the other subband when the UL control information decoding was successful in one specific subband.

Method 4

After performing a channel access procedure for each subband, the UE may configure a specific subband to transmit UL control information based on a specific rule among at least one of idle subbands for performing UL transmission. For example, the UE may determine a specific subband by using a combination of at least one of a UE ID, an RNTI value, a CRC, and the number of idle subbands (K). For example, the UE may transmit UL signals including UL control information in a subband having an index determined to a mod (UE ID×RNTI, K).

The above-described guard band use indicator may be used as information for indicating (or determining), to the BS, a result of the performed channel access procedure for each subband that the UE obtained in addition to whether a guard band is used or not.

The UE may determine whether to use a guard band for UL signal transmission by receiving the guard band use indicator from the BS or by using the scheduling information received from the BS. When transmitting DL control information to the UE, the BS may transmit with a guard band use indicator. The guard band use indicator may be included in the DL control information by the above-described bit signaling.

Alternatively, the UE may determine whether to use a guard band by using at least one of a channel occupancy time (or frequency), a channel access procedure performing method (e.g., Type 3), a UL transmission start symbol location, or a DL channel sharing indicator among the scheduling information received from the BS. For example, when the point of receiving UL scheduling from the BS is within a channel occupancy time (or frequency) of the BS, a BS occupied channel share indication is received, the UE is configured by the BS with UL signals without performing a channel access procedure (e.g., Type 3 channel access procedure), or a UL transmission start point is included in a gap guard (e.g., 16 μs) that does not need performing of a channel access procedure, the UE may determine that UL transmission is performed in a guard band within consecutive subbands scheduled by the BS.

In accordance with an embodiment of the embodiment, a method and apparatus are provided for performing, by a UE, a channel access procedure for each subband in a wide unlicensed band, and transmitting to a BS, a result of the performed channel access procedure for each subband.

Figure 9:
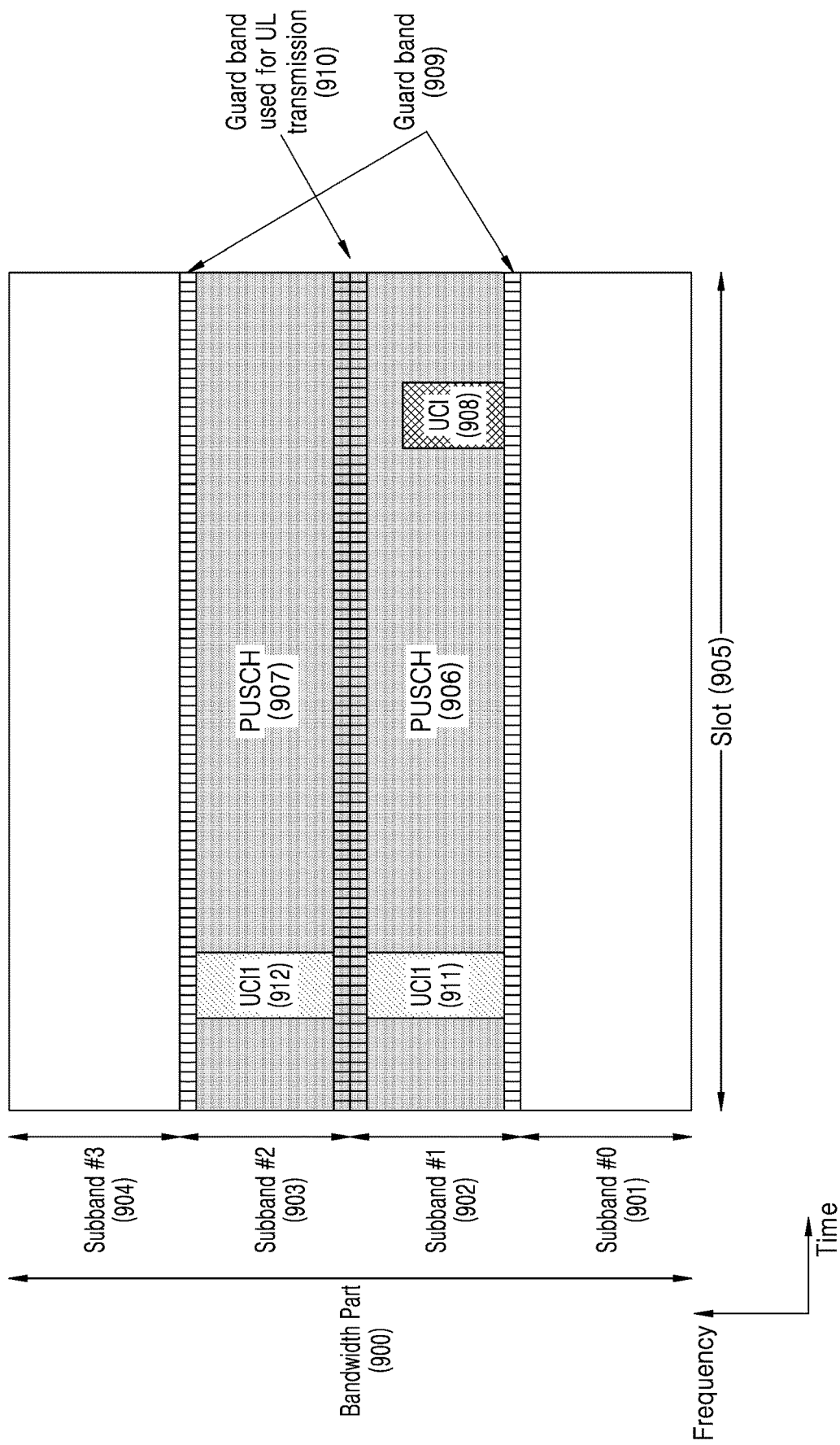
FIG. 9 illustrates a UE performing a channel access procedure for each subband and transmitting a result thereof to a base station (BS) in a wide unlicensed band, according to an embodiment.

FIG. 9 illustrates a UE performing a channel access procedure for each subband and transmitting a result of the performed channel access procedure for each subband to the BS in a wide unlicensed band, according to an embodiment.

Referring to FIG. 9, the UE may perform a channel access procedure for each subband in a wide unlicensed band, and inform the BS of a result of the performed channel access procedure. The UE may inform the BS of information about a subband that is determined as an idle band and to be used for transmitting UL signals, by including the information in UL control information by bit signaling.

The UE may determine a subband #1 902 and a subband #2 903 as idle bands as a result of the performed channel access procedure, and perform UL transmission in the subbands 902 and 903 that are determined as idle bands. The UE may transmit bit signaling (e.g., 0110) to the BS by including the bit signaling in UL control information. The UL control information may be transmitted after a specific time or after at least one slot, from a slot 905 for performing the first UL transmission.

The UE may also perform the first UL transmission to the BS by including UL control information 908 in UL signals, by puncturing or rate matching in the slot 905 for performing the first UL transmission. The puncturing or rate matching may be determined considering at least a payload size or a processing time of the UL control information. For example, when the payload size is less than or equal to [X] bits or the processing time (or symbol) for generating UL signals after rate matching is less than or equal to [Y], the UE may perform puncturing to include the UL control information in the UL signals.

The above-described channel access procedure result indicated by the UE to the BS may be used as information for determining (or indicating) use of a guard band between the consecutive subbands by the BS or UE.

In accordance with an embodiment of the disclosure, a method and apparatus are provided for performing, by the UE, a channel access procedure for each subband for UL transmission in a wide unlicensed band, and configuring (or determining) a location of UL control information when transmitting UL signals as a result of the performed channel access procedure.

Referring again to FIG. 9, when the UE tries to transmit UL signals, and the above-described guard band use indicator is included in the UL signals or the UL signals are not transmitted in a guard band, UL control information 911 and 912 may not be included in a guard band. For example, when the UE tries to transmit UL signals in the consecutive subbands 902 and 903 as a result of the performed channel access procedure, the UL signals may be transmitted in a guard band 910 located between the consecutive subbands 902 and 903. The UE may not locate, in the guard band 910, the UL control information 911 and 912 indicating whether a guard band is used or not.

Instead, the UE may transmit the above-described result of the channel access procedure performed by the UE, as separate UL control information, to the BS. The UE may transmit UL control information by including the UL control information in the first UL signal transmission, in a slot for performing the first UL transmission, by puncturing or rate matching. The UL control information location in a slot for performing the first UL transmission may be determined as described below.

Figure 10:
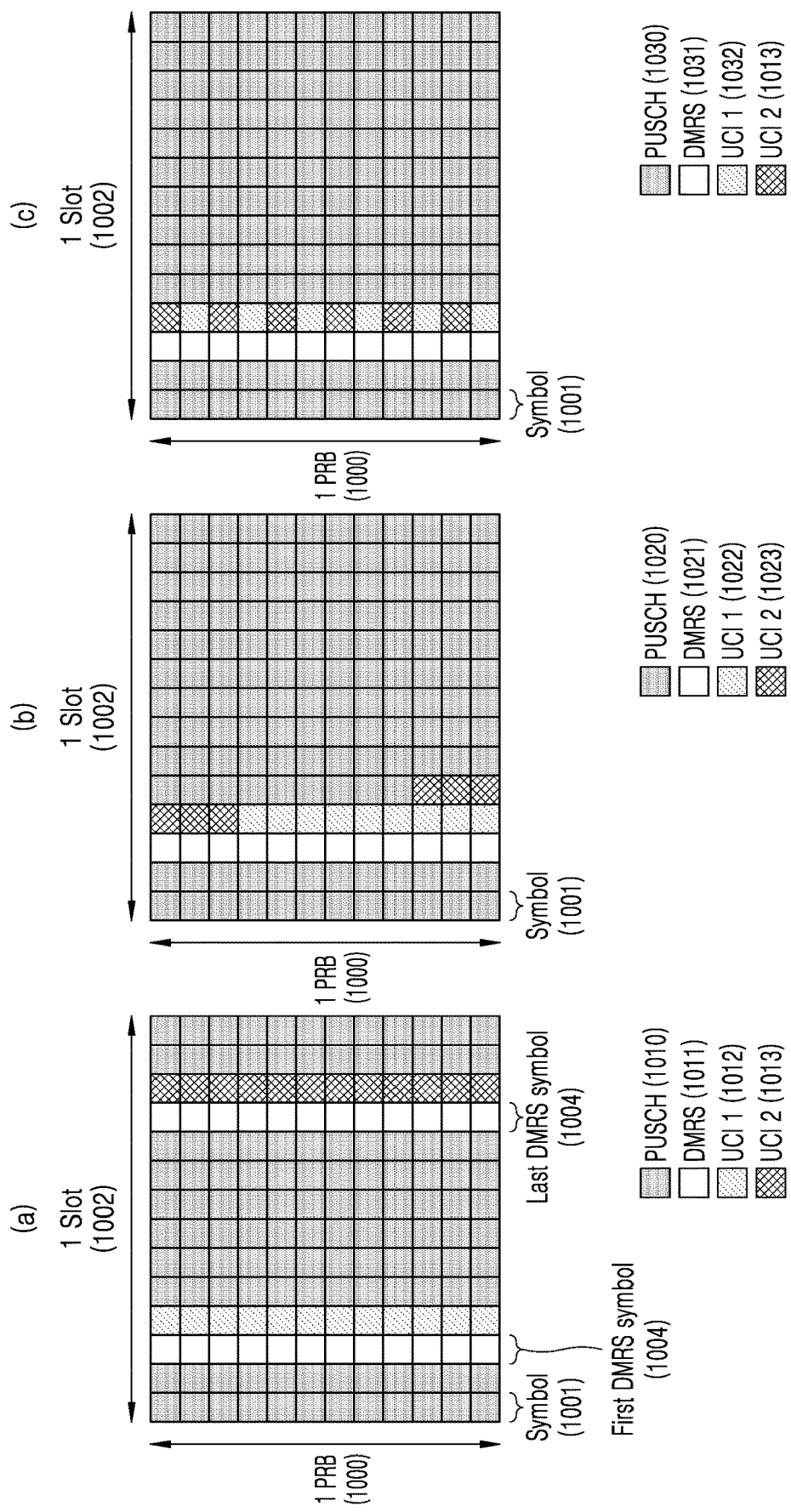
FIG. 10 illustrates a UE determining a location of uplink control information in a slot in which uplink transmission is performed in a wide unlicensed band, according to an embodiment.

FIG. 10 illustrates a UE determining a location of uplink control information in a slot in which uplink transmission is performed in a wide unlicensed band, according to an embodiment.

Referring to FIG. 10, when a plurality of DMRS transmissions are configured within one slot during a UL signal transmission, the UE may transmit UL signals by including UL control information 1013 in the first symbol capable of UL signal transmission after a last DMRS 1004. The UL control information may be mapped from the lowest (or highest) resource element, and mapped with a specific interval according to the number bits being mapped.

The UE may transmit UL signals by including UL control information 1023 therein from the first symbol or the first resource element where UL data transmission starts after the first DMRS.

The BS may indicate, to the UE, a resource region for transmitting separate UL control information, by higher layer signaling or DL control information. For example, when the BS indicates to the UE UL control channel information transmission in a symbol #9, the UE may map the UL control channel information from the lowest (or highest) resource element of the symbol #9.

The UE may transmit a mapping location of separate UL control information by configuring a time or frequency domain location of the separate UL control information in existing UL control information. The BS may first decode the existing UL control information and then separate UL control information by obtaining the mapping location of separate UL control information.

Referring again to FIG. 10, the UE may perform puncturing of performed channel access procedure result information 1033 in a region 1032 where existing UL control information is located. The UE may determine regarding the performed puncturing according to the priority of information included in the existing UL control information. For example, the UE may transmit a result of the performed channel access procedure to the BS by puncturing a resource element having channel information or HARQ feedback information.

In accordance with an embodiment of the disclosure, a method and apparatus are provided for changing (or adjusting) a location of UL control information included when the UE transmits UL signals, when the UE performs a channel access procedure for each subband in a wide unlicensed band and transmits a result of the channel access procedure performed by the UE to the BS.

The UE may perform a channel access procedure for each subband, and inform the BS of a result of the performed channel access procedure by the above-described method. The UE may change (or adjust) a mapping location of UL control information transmitted during UL signal transmission after a specific time or at a slot after at least one slot from a slot for transmitting a result of the performed channel access procedure.

Figure 11:
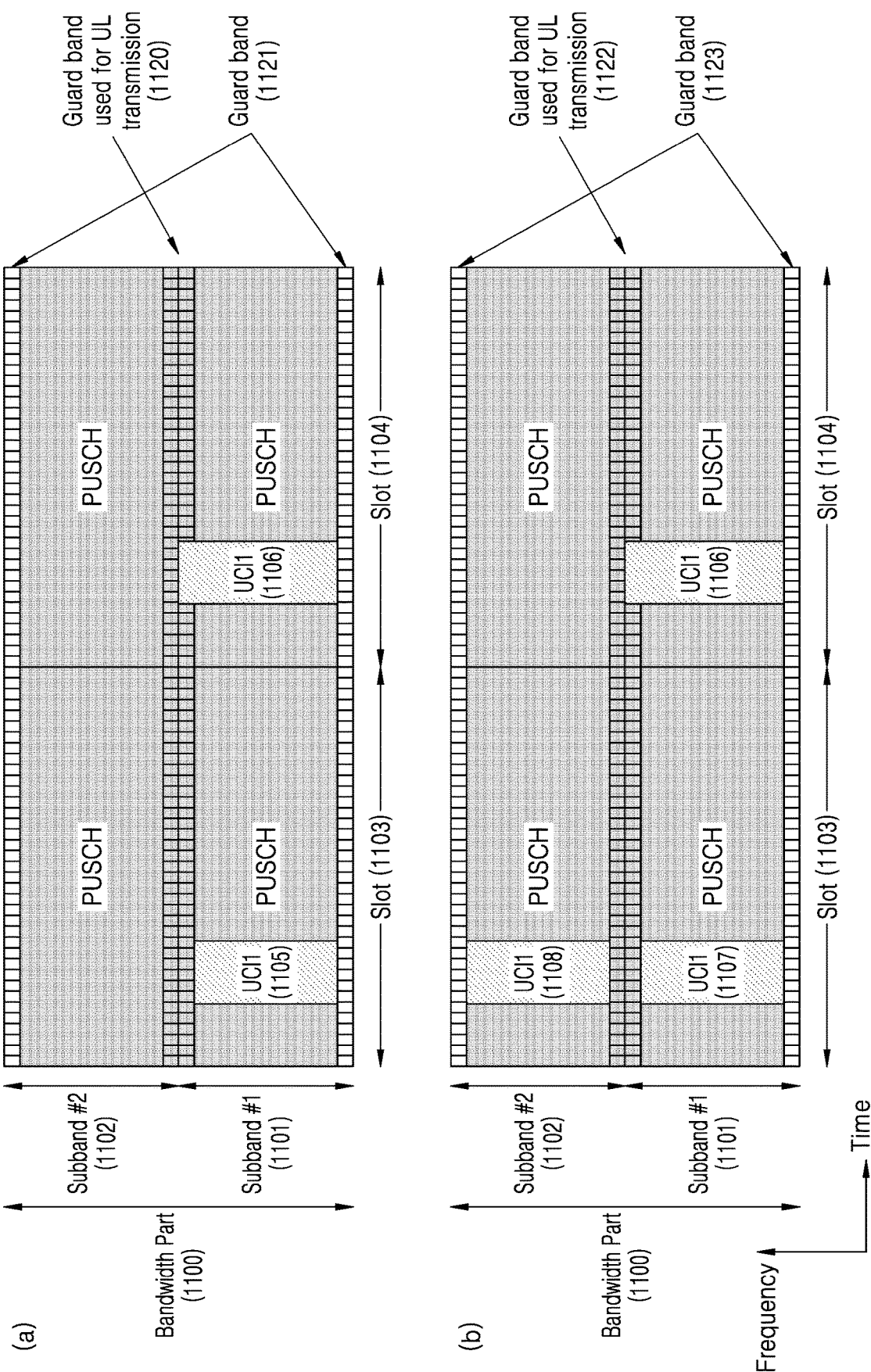
FIG. 11 illustrates a UE changing a location of uplink control information, according to an embodiment.

FIG. 11 illustrates a UE changing (or adjusting) a location of uplink control information, according to an embodiment.

Referring to FIG. 11, the UE may transmit a guard band use indicator to the BS, or a result of the channel access procedure performed by the UE indicating UL signal transmission in the consecutive subbands 1101 and 1102 to the BS. The UE may transmit UL signals including UL control information 1106 even in a guard band 1120 between the consecutive subbands 1101 and 1102 after a specific time or after at least next slot 1104 from a slot 1103 for transmitting UL signals including UL control information. The UE may determine the number of bits of the UL control information considering the guard band 1120. A slot or specific time to which a changed mapping location of the UL control information is applied may be received from the BS by higher layer signaling or DL control information.

The UE may transmit the UL control information 1107 and 1108 in a plurality of subbands before transmitting a result of the performed channel access procedure for each subband or a guard band use indicator to the BS. In this case, each UL control information may include information about at least each subband (e.g., different transmission data for each subband) or information about all subbands for transmitting UL (e.g., one transmission data in a plurality of subbands).

The UE may transmit a guard band use indicator to the BS, or a result of the channel access procedure performed by the UE indicating UL signal transmission in the consecutive subbands 1101 and 1102, to the BS. In this case, the UE may transmit, to the BS, UL control information 1107 and 1108 including information to indicate (or determine) a result of the channel access procedure by the UE, by including UL control information 1109 only in at least one specific subband after a specific time or after at least a next slot 1114 from a slot 1113 for transmitting the corresponding UL control information.

After performing a channel access procedure for each subband, the UE may transmit UL signals by including UL control information therein, only in a subband having the lowest (or the highest) subband index (or configuration index) among at least one of idle subbands for performing UL transmission. Alternatively, the UE may perform UL transmission by including UL control information therein, only in a subband configured for CORESET #0 to SS/PBCH block transmission, or the UE may transmit UL signals by including UL control information therein in a subband that the BS indicated by using higher layer signals or control channel.

The UE may also determine a subband for including UL control information by one or more combinations of the above-described methods. When UL control information decoding is successful in one specific subband, the BS may not perform UL control information decoding on the other subbands.

After performing a channel access procedure for each subband, the UE may configure a specific subband to transmit UL control information based on a specific rule among at least one idle subband for performing UL transmission. For example, the UE may determine a specific subband by using a combination of at least one of a UE ID, an RNTI value, a CRC, and the number of idle subbands (K). As an example, the UE may transmit UL signals including UL control information in a subband having an index determined to a mod (UE ID×RNTI, K).

Although UL signal transmission is described as an example in the above-described embodiments of the disclosure, the method and apparatus proposed by the embodiment of the disclosure may not be limited to the UL signal transmission, but may be applied to DL signal transmission. For example, when the BS performs a channel access procedure for DL signal transmission, and transmits DL signals by using consecutive subbands as a result of the preformed channel access procedure, the BS may transmit DL signals by including a guard band use indicator in DL control signals.

Figure 12:
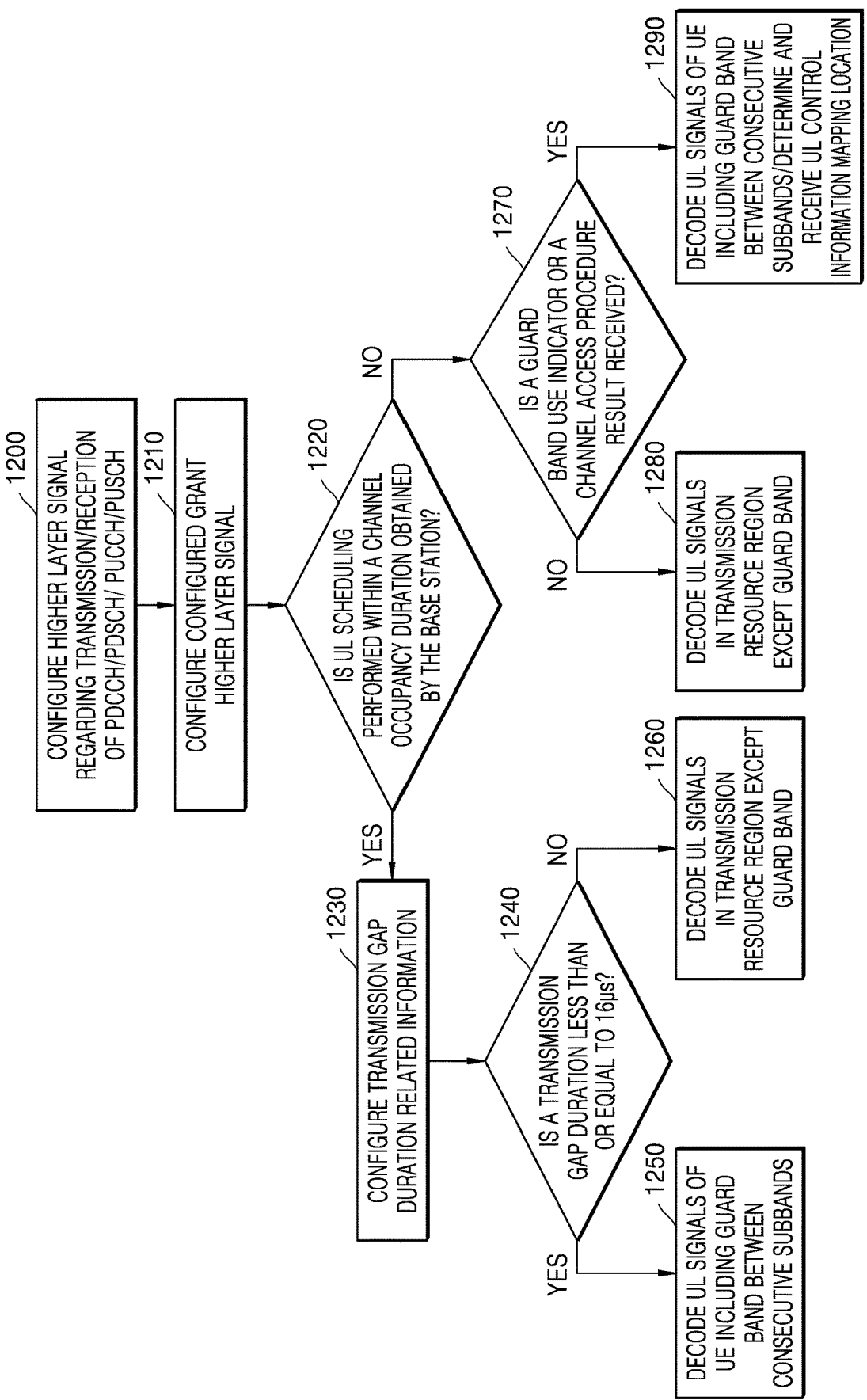
FIG. 12 is a flowchart illustrating an operation of a BS according to an embodiment.

FIG. 12 is a flowchart illustrating an operation of a BS according to an embodiment.

Referring to FIG. 12, in step 1200, the BS transmits a configuration about transmission/reception of a PDCCH, a PDSCH, a PUCCH, or a PUSCH, to the UE, by higher layer signaling. For example, the BS may transmit a PDCCH resource region or CORESET configuration for receiving DL or UL scheduling information or a search space configuration, to the UE, by higher layer signaling. The BS may transmit a configuration about PDSCH/PUSCH transmission/reception, including offset information between a PDCCH receiving slot, a PDSCH receiving slot, or a PUSCH transmitting slot, or information about repeated PDSCH or PUSCH transmission numbers, to the UE, by higher layer signaling.

In step 1210, the BS transmits grant-free related configuration information, such as grant-free transmission cycle and offset information. Alternatively, the grant-free related configuration information transmitted to the UE in step 1210 may be transmitted in step 1200.

In step 1220, the BS determines UL scheduling is performed on the UE within a channel occupancy duration obtained by the BS.

When UL scheduling is performed on the UE within a channel occupancy duration obtained by the BS in step 1220, the BS configures transmission gap duration related information to the UE in step 1230. For example, the BS may perform UL transmission configuration to the UE by transmitting a channel occupancy time (or frequency), a channel access procedure performing method (e.g., Type 3), a UL transmission start symbol location, or a DL channel sharing indicator.

In step 1240, the BS determines whether the transmission gap duration that the BS configured to the UE satisfies a specific value or condition.

When the transmission gap duration that the BS configured to the UE satisfies a specific value or condition (e.g., 16 μs or less) in step 1240, the BS determines that, during UL transmission by the UE, the guard band between the consecutive subbands may be used for UL signal transmission, and decodes UL signals of UE including the signals transmitted in the guard band between the consecutive subbands in step 1250.

However, when the configured transmission gap duration does not satisfy a specific value or condition in step 1240, the BS decodes UL signals in a transmission resource region, except the guard band between the consecutive subbands, in step 1260.

When UL scheduling is not performed on the UE within a channel occupancy duration obtained by the BS in step 1220, the BS determines whether a guard band use indicator or a result of the channel access procedure is received from the UE in step 1270.

When the BS receives, from the UE, a guard band use indicator or a result of the channel access procedure in step 1270, the BS determines that the guard band between the consecutive subbands is used for UL transmission, and determines (or changes) a mapping location of UL control information, and decodes UL signals of UE including the signals transmitted in the guard band between the consecutive subbands in step 1290.

When the BS does not receive, from the UE, a guard band use indicator or a result of the channel access procedure in step 1270, the BS decodes UL signals in a transmission resource region, except the guard band between the consecutive subbands, in step 1280.

Figure 13:
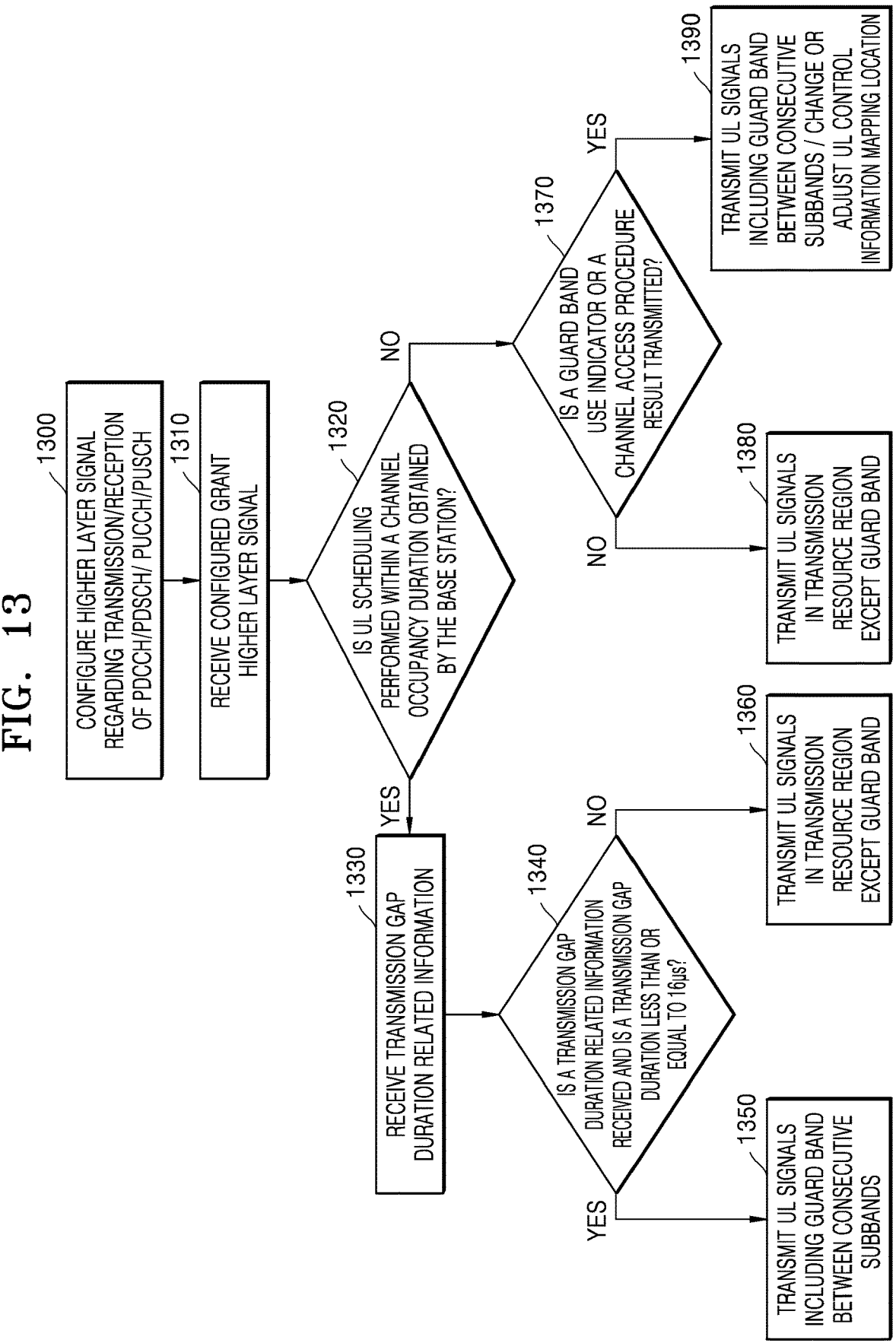
FIG. 13 is a flowchart illustrating an operation of a UE according to an embodiment.

FIG. 13 is a flowchart illustrating UE operations according to an embodiment.

Referring to FIG. 13, in step 1300, the UE receives, from the BS, a configuration about transmission/reception of a PDCCH, a PDSCH, a PUCCH, or a PUSCH by using higher layer signals, and performs a configuration about the transmission/reception of the PDCCH, the PDSCH, the PUCCH, or the PUSCH based on the received configuration information. For example, the UE may be configured with a configuration of a PDCCH resource region or a CORESET for receiving DL or UL scheduling information, or a search space configuration, from the BS, by using higher layer signals.

In step 1310, the UE is configured with grant-free related configuration information, such as grant-free transmission cycle and offset information. Alternatively, steps 1300 and 1310 may be performed together.

In step 1320, the UE determines whether UL scheduling is performed in a channel occupancy duration obtained by the BS.

When the UE receives UL scheduling in a channel occupancy duration obtained by the BS in step 1320, the UE is configured with transmission gap duration related information from the BS in step 1330. For example, the UE may receive from the BS information, such as a channel occupancy time (or frequency), a channel access procedure performing method (e.g., Type 3), a UL transmission start symbol location, or a DL channel sharing indicator.

In step 1340, the UE determines whether the transmission gap duration configured by the BS to the UE satisfies a specific value or condition.

When the transmission gap duration configured by the BS to the UE satisfies a specific value or condition (e.g., 16 μs or less) in step 1340, the UE transmits UL signals during UL transmission by using a guard band between the consecutive subbands in step 1350.

However, when the configured transmission gap duration does not satisfy a specific value or condition in step 1340, the UE transmits UL signals in the transmission resource region, except the guard band between the consecutive subbands, in step 1360.

When the UE does not receive UL scheduling in a channel occupancy duration obtained by the BS in step 1320, the UE determines if a guard band use indicator or a channel access procedure result is to be transmitted in step 1370.

When the UE will transmit, to the BS, a guard band use indicator or a channel access procedure result in step 1370, the UE transmits UL signals by using the guard band between the consecutive subbands, and changes (or adjusts) a location for transmitting UL control information in step 1390.

However, when the UE does not transmit, to the BS, a guard band use indicator or a result of the channel access procedure in step 1370, the UE transmits UL signals in the transmission resource region, except the guard band between the consecutive subbands, in step 1380.

In accordance with an embodiment of the disclosure, a method is provided for receiving DL signals and transmitting UL signals when the UE does not receive a DCI indicating a slot format, in the BS and the UE configured to receive or transmit DL signals or UL signals in an unlicensed band.

When a channel is determined to be occupied as a result of a channel access procedure, the BS operating in an unlicensed band may not perform DL transmission. For example, the BS may not transmit a DCI indicating a slot format to the UE. The UE that has not received an indication of a slot format may not perform UL transmission or DL reception configured by using the above-described higher layer signals, and thus performance deterioration may occur.

Figure 14:
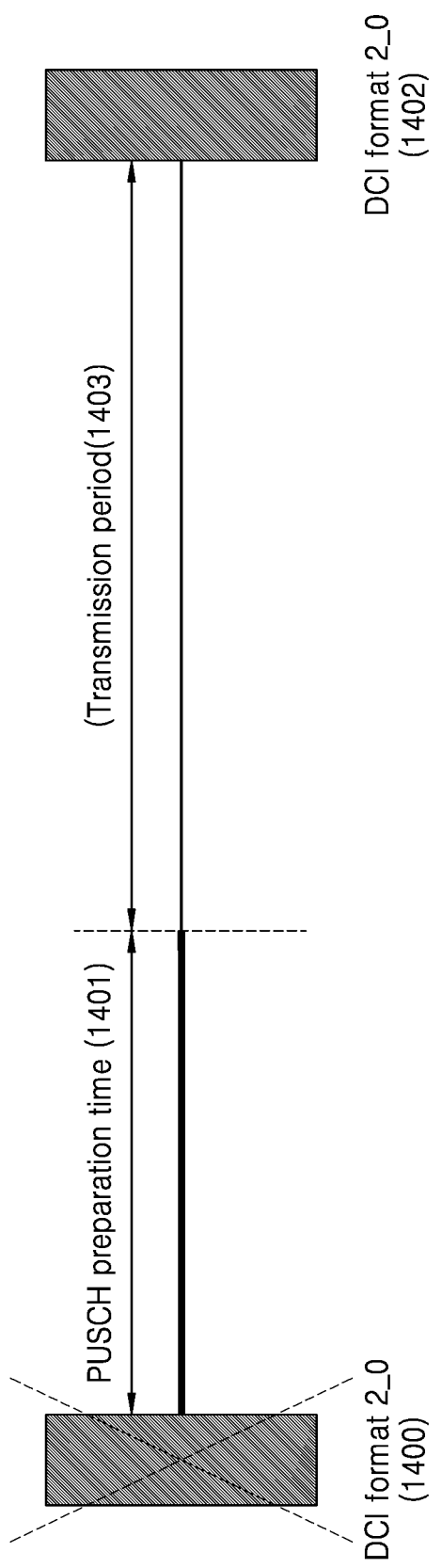
FIG. 14 illustrates receiving downlink signals or transmitting uplink signals when a UE does not receive downlink control information (DCI) indicating a slot format, according to an embodiment.

FIG. 14 illustrates receiving downlink signals or transmitting uplink signals when a UE does not receive DCI indicating a slot format, according to an embodiment.

Referring to FIG. 14, the UE may receive DCI indicating a slot format (e.g., DCI format 2_0) or perform monitoring on DCI indicating a slot format in a time/frequency domain configured by higher layer signaling.

When the UE misses DCI indicating a slot format or the BS fails channel access and does not transmit DCI indicating a slot format, the UE may not receive (or decode) DCI indicating a slot format 1400. In this case, UL signals configured by using higher layer signals may not be transmitted or DL signals configured by using higher layer signals may not be received for a certain time 1401 from a last symbol of a time domain configured to monitor or receive, by the UE, DCI indicating a slot format. The certain time 1401 may include at least one of UL (or PUSCH) preparation time (or processing time), DL (or PDSCH) preparation time (or processing time), or timing advance time.

UL signals configured by using higher layer signals may include at least one of UL transmission (configured grant PUSCH), periodic/aperiodic/semi-static SRS transmission, PUCCH (or scheduling request), or PRACH transmission, which does not require scheduling. DL signals configured by using higher layer signals may include at least one of DL transmission or CSI-RS, which does not require scheduling. The UE may transmit UL signals configured by using higher layer signals for a specific time 1403 after the certain time 1401, e.g., until a start symbol of a time domain for monitoring or receiving next DCI indicating a slot format 1402. In this case, the UE may not receive DL signals that are not configured by using higher layer signals.

The BS may configure the UE to perform the above-described operation by separate higher layer signaling or indicate the UE to perform the above-described operation by L1 signaling.

Figure 15:
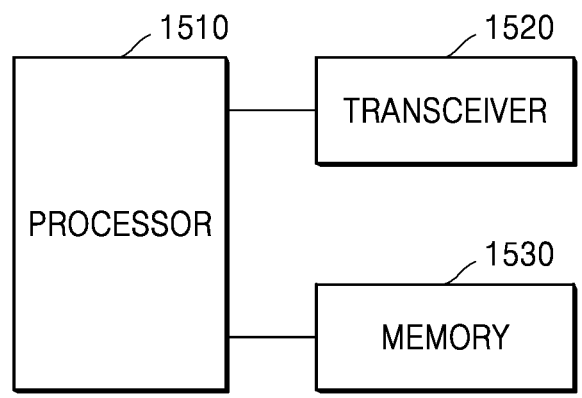
FIG. 15 illustrates a BS according to an embodiment.

FIG. 15 illustrates a BS according to an embodiment.

Referring to FIG. 15, the BS includes a processor 1510, a transceiver 1520, and a memory 1530. However, constituent elements of the BS are not limited to the above-described example. The UE may include more or less constituent elements than the above-described constituent elements. In addition, the processor 1510, the transceiver 1520, and the memory 1530 may be implemented in the form of one chip. The transceiver 1520 and the processor 1510 may be operated according to the above-described communication method of the BS.

The transceiver 1520 may transmit/receive signals to/from the UE. The signals may include control information and data. The transceiver 1520 may include a radio frequency (RF) transmitter for up converting and amplifying the frequency of transmitted signals and an RF receiver for low-noise amplifying received signals and down converting the frequency of the signals. However, the constituent elements of the transceiver 1520 are not limited to the RF transmitter and the RF receiver.

Transceiver 1520 may receive signals through a wireless channel and output the received signals to the processor 1510, and transmit signals output from the processor 1510 through the wireless channel.

The processor 1510 may control a series of processes in order for the base state to operate according to the above-described embodiments of the disclosure. The processor 1510 may perform a channel access procedure with respect to an unlicensed band. For example, the processor 1510 may receive signals transmitted by the transceiver 1520 in an unlicensed band, and determine whether the unlicensed band is in an idle state by comparing the intensity of the received signal with a predetermined value, a value of a function having a BW as a factor, or a determined threshold value. The processor 1510 may change or reconfigure a UL signal receiving method based on the UL control information transmitted by the UE.

The memory 1530 may store a program and data needed for the operation of the BS. The memory 1530 may store control information or data included in the signals obtained by the BS. The memory 1530 may include storage media such as a read only memory (ROM), a random access memory (RAM), hard disks, a compact disc (CD)-ROM, and a digital versatile disc (DVD) or a memory including a combination of storage media. The memory 1530 may include a plurality of memories.

Figure 16:
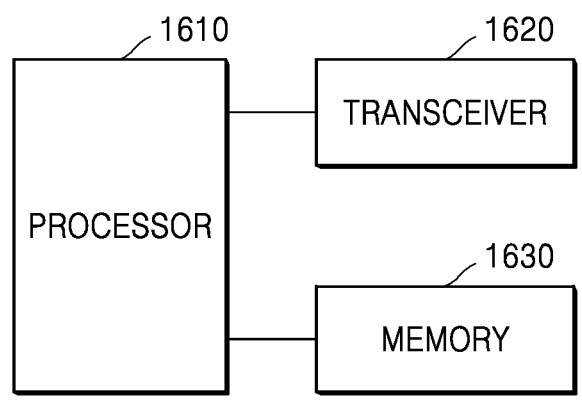
FIG. 16 illustrates a UE according to an embodiment.

FIG. 16 illustrates a UE according to an embodiment.

Referring to FIG. 16, the UE includes a processor 1610, a transceiver 1620, and a memory 1630. However, the constituent elements of the UE are not limited to the above-described example, and the UE may include more or less constituent elements. The processor 1610, the transceiver 1620, and the memory 1630 may be implemented in the form of one chip.

The transceiver 1620 may transmit/receive signals to/from the BS. The signals may include control information and data. The transceiver 1620 may include an RF transmitter for up converting and amplifying the frequency of transmitted signals and an RF receiver for low-noise amplifying received signals and down converting the frequency of the signals. The transceiver 1620 may receive signals through a wireless channel and output the received signals to the processor 1610, and transmit signals output from the processor 1610 through the wireless channel.

The processor 1610 may control a series of processes in order for the UE to operate according to the above-described embodiments of the disclosure. For example, the processor 1610 may receive data signals including control signals via the transceiver 1620, and determine a result of the receiving of the data signals. When a first signal receiving result including data receiving is to be transmitted to the BS at the above-described timing, the processor 1610 may transmit the above-described first signal receiving result to the BS at a determined timing via the transceiver 1620.

As another example, the processor 1610 may generate, as UL control information, information for the BS to receive UL signals and determine a receiving method. In this case, the control information may be changed according to a result of the performed channel access procedure and a UL signal generation method.

The above-described embodiments of the disclosure merely provide examples to explain the technical content of the disclosure and to help understanding of the disclosure, and are not intended to limit the scope of the disclosure. Those skilled in the art to which the disclosure pertains will appreciate that other modifications based on the technical concept of the disclosure can be implemented.

In addition, the above-described respective embodiments can be operated in combination with each other as necessary. For example, the BS and the UE may be operated as some of the methods proposed in the disclosure are combined with each other.

Although the above-described embodiments have been presented based on the 5G and NR systems, other modifications based on the technical concept of the above-described embodiments may be implemented in other systems such as LTE, LTE-A, LTE-A-Pro system, or vehicle-to-everything (V2X).

While the disclosure has been shown and described with reference to certain embodiments thereof, it will be understood by those skilled in the art that various changes in form and details may be made therein without departing from the spirit and scope of the disclosure as defined by the appended claims and any equivalents thereof.

What is claimed is:

1. A method performed by a terminal in a wireless communication system, the method comprising:
    identifying a first idle subband and a second idle subband in an unlicensed band, wherein the first idle subband and the second idle subband are consecutive; and
    transmitting, to a base station, an uplink signal including uplink control information in at least one of the first idle subband and the second idle subband,
    wherein the uplink control information includes information indicating whether a guard band between the first idle subband and the second idle subband is used for an uplink transmission, and
    wherein the uplink signal is decoded based on the uplink control information.

2. The method of claim 1, wherein the guard band includes a first guard band in the first idle subband and a second guard band adjacent to the first guard band in the second idle subband, and
    wherein the first guard band protects a listen before talk (LBT) procedure performed on the second idle subband and the second guard band protects the LBT procedure performed on the first idle subband.

3. The method of claim 1, wherein the uplink control information is transmitted in one of the first idle subband and the second idle subband.

4. The method of claim 1, wherein the uplink control information is not transmitted in the guard band.

5. The method of claim 1, wherein the uplink control information includes information of the first idle subband and the second idle subband.

6. The method of claim 5, wherein the uplink control information includes first uplink control information and second uplink control information, and
    wherein the second uplink control information includes the information of the first idle subband and the second idle subband.

7. The method of claim 6, wherein resources that are used for transmitting the second uplink control information are indicated by the base station.

8. The method of claim 6, wherein the first uplink control information includes information that resources used for transmitting the second uplink control information are indicated by the first uplink control information.

9. The method of claim 1, wherein identifying the first idle subband and the second idle subband in an unlicensed band comprises performing a listen before talk (LBT) procedure on each of a plurality of subbands in the unlicensed band; and
    identifying the first idle subband and the second idle subband based on a result of performing the LBT procedure.

10. A method performed by a base station in a wireless communication system, the method comprising:
    receiving, from a terminal, an uplink signal including uplink control information in at least one of a first subband and a second subband in an unlicensed band, wherein the first subband and the second subband are consecutive; and
    decoding the uplink signal based on the uplink control information,
    wherein the first subband and the second subband are included in idle subbands identified by the terminal in the unlicensed band, and
    wherein the uplink control information includes information indicating whether a guard band between the first subband and the second subband is used for uplink transmission.

11. The method of claim 10, wherein the guard band includes a first guard band in the first subband and a second guard band adjacent to the first guard band in the second subband, and
    wherein the first guard band protects a listen before talk (LBT) procedure performed on the second subband and the second guard band protects the LBT procedure performed on the first subband and the first guard band.

12. The method of claim 10, wherein the uplink control information is transmitted in one of the first subband and the second subband.

13. The method of claim 10, wherein the uplink control information is not transmitted in the guard band.

14. The method of claim 10, wherein the uplink control information includes information of the identified idle subbands.

15. The method of claim 14, wherein the uplink control information includes first uplink control information and second uplink control information, and
wherein the second uplink control information includes the information of the identified idle subbands.

16. The method of claim 15, wherein resources that are used for transmitting the second uplink control information are indicated by the base station.

17. The method of claim 15, wherein the first uplink control information includes information that resources used for transmitting the second uplink control information are indicated by the first uplink control information.

18. The method of claim 10, wherein the first subband and the second subband are identified by the terminal as the idle subbands based on a result of performing a listen before talk (LBT) procedure on each of a plurality of subbands in the unlicensed band.

19. A terminal, comprising:
a transceiver; and
a processor configured to:
   identify a first idle subband and a second idle subband in an unlicensed band, wherein the first idle subband and the second idle subband are consecutive; and
   transmit, to a base station, via the transceiver, an uplink signal including uplink control information in at least one of the first idle subband and the second idle subband,
wherein the uplink control information includes information indicating whether a guard band between the first idle subband and the second idle subband is used for uplink transmission, and
wherein the uplink signal is decoded based on the uplink control information.

20. A base station, comprising:
a transceiver; and
a processor configured to:
   receive, from a terminal, via the transceiver, an uplink signal including uplink control information in at least one of a first subband and a second subband in an unlicensed band, wherein the first subband and the second subband are consecutive; and
   decode the uplink signal based on the uplink control information,
wherein the first subband and the second subband are included in idle subbands identified by the terminal in the unlicensed band, and
wherein the uplink control information includes information indicating whether a guard band between the first subband and the second subband is used for uplink transmission.

* * * * *